(12) United States Patent
Yamada et al.

(10) Patent No.: US 11,818,316 B2
(45) Date of Patent: Nov. 14, 2023

(54) IMAGE PROCESSING APPARATUS AND METHOD FOR EMBEDDING SPECIFIC INFORMATION BASED ON TYPE OF DESIGNATED PRINTING APPARATUS

(71) Applicant: CANON KABUSHIKI KAISHA, Tokyo (JP)

(72) Inventors: Akitoshi Yamada, Kanagawa (JP); Hiroyasu Kunieda, Kanagawa (JP); Yoichi Kashibuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/971,696

(22) Filed: Oct. 24, 2022

(65) Prior Publication Data

US 2023/0136501 A1 May 4, 2023

(30) Foreign Application Priority Data

Oct. 29, 2021 (JP) ................................. 2021-178185

(51) Int. Cl.
*H04N 1/23* (2006.01)
*H04N 1/407* (2006.01)
*H04N 1/32* (2006.01)

(52) U.S. Cl.
CPC ....... *H04N 1/2315* (2013.01); *H04N 1/32208* (2013.01); *H04N 1/32229* (2013.01); *H04N 1/32309* (2013.01); *H04N 1/407* (2013.01); *H04N 2201/3226* (2013.01)

(58) Field of Classification Search
CPC ............. H04N 1/2315; H04N 1/32144; H04N 1/32208; H04N 1/32229; H04N 1/32309; H04N 1/407; H04N 2201/3226; G06K 15/1889; G06K 15/4095; G06F 3/1238; G06F 3/1243
See application file for complete search history.

(56) References Cited

U.S. PATENT DOCUMENTS

| 5,737,100 A | * | 4/1998 | Funada | .............. H04N 1/00859 358/401 |
| 6,191,874 B1 | | 2/2001 | Yamada et al. | |
| 6,522,766 B1 | | 2/2003 | Ratnakar | |

(Continued)

FOREIGN PATENT DOCUMENTS

JP 2000-299779 A 10/2000

*Primary Examiner* — Scott A Rogers
(74) *Attorney, Agent, or Firm* — Venable LLP

(57) ABSTRACT

Provided is an image processing apparatus for generating a printed document with specific information embedded therein, including: a first obtaining unit configured to obtain image data to be used in printing; a second obtaining unit configured to obtain the specific information; an acceptance unit configured to accept designation of a printing apparatus for executing printing; an embedding condition determination unit configured to determine a condition for embedding the specific information into the image data according to a type of the accepted printing apparatus; a multiplexed image generation unit configured to generate a multiplexed image by executing embedding of the specific information under the condition determined by the embedding condition determination unit; and a control unit configured to perform control such that the printing apparatus prints the multiplexed image.

20 Claims, 18 Drawing Sheets

(56) References Cited

U.S. PATENT DOCUMENTS

| | | | |
|---|---|---|---|
| 6,678,390 B1 * | 1/2004 | Honsinger | G06T 1/005 380/54 |
| 6,813,385 B2 * | 11/2004 | Ideyama | H04N 1/32529 358/1.14 |
| 7,505,179 B2 * | 3/2009 | Matsunoshita | H04N 1/32309 358/1.9 |
| 7,924,469 B2 | 4/2011 | Ono et al. | |
| 7,944,588 B2 | 5/2011 | Yamada et al. | |
| 8,102,558 B2 | 1/2012 | Goto et al. | |
| 8,102,567 B2 | 1/2012 | Kashibuchi | |
| 8,175,155 B2 | 5/2012 | Suwa et al. | |
| 8,223,389 B2 | 7/2012 | Kashibuchi | |
| 8,237,991 B2 | 8/2012 | Ono et al. | |
| 8,274,679 B2 * | 9/2012 | Tsuchitoi | H04N 1/32128 382/175 |
| 8,295,598 B2 | 10/2012 | Inoue et al. | |
| 8,345,314 B2 * | 1/2013 | Wang | H04N 1/32251 358/469 |
| 8,405,876 B2 | 3/2013 | Nakatani et al. | |
| 9,189,681 B2 | 11/2015 | Kunieda et al. | |
| 9,214,027 B2 | 12/2015 | Sumi et al. | |
| 9,275,270 B2 | 3/2016 | Suwa et al. | |
| 9,594,534 B2 | 3/2017 | Sasaki et al. | |
| 10,013,395 B2 | 7/2018 | Kajiwara et al. | |
| 10,033,904 B2 * | 7/2018 | Miyake | H04N 1/32144 |
| 10,275,652 B2 | 4/2019 | Yamamoto et al. | |
| 10,290,135 B2 | 5/2019 | Mizoguchi et al. | |
| 10,740,641 B2 | 8/2020 | Iguchi et al. | |
| 10,742,823 B2 | 8/2020 | Iguchi et al. | |
| 10,796,405 B2 | 10/2020 | Kunieda et al. | |
| 10,958,796 B2 | 3/2021 | Obayashi et al. | |
| 11,074,734 B2 | 7/2021 | Kunieda et al. | |
| 11,089,170 B2 | 8/2021 | Kunieda et al. | |
| 11,140,277 B2 | 10/2021 | Yamada et al. | |
| 11,218,603 B2 | 1/2022 | Kunieda et al. | |
| 11,361,487 B2 | 6/2022 | Yamada et al. | |
| 11,393,145 B2 | 7/2022 | Kunieda et al. | |
| 11,450,045 B2 | 9/2022 | Yamada et al. | |
| 11,470,209 B2 | 10/2022 | Takeichi et al. | |
| 11,488,337 B2 | 11/2022 | Kunieda et al. | |
| 11,677,894 B2 * | 6/2023 | Yamada | H04N 1/58 358/1.13 |
| 2003/0113123 A1 * | 6/2003 | Yamaguchi | H04N 1/32144 399/2 |
| 2008/0151288 A1 * | 6/2008 | Matsunoshita | H04N 1/32144 358/1.15 |
| 2012/0268759 A1 | 10/2012 | Ono et al. | |
| 2020/0279423 A1 | 9/2020 | Yamada et al. | |
| 2020/0279426 A1 | 9/2020 | Yamada et al. | |
| 2020/0336607 A1 | 10/2020 | Kunieda | |
| 2020/0336608 A1 | 10/2020 | Kunieda | |
| 2022/0262054 A1 | 8/2022 | Takeichi et al. | |
| 2022/0262055 A1 | 8/2022 | Takeichi et al. | |
| 2022/0262056 A1 | 8/2022 | Takeichi et al. | |
| 2022/0262057 A1 | 8/2022 | Takeichi et al. | |
| 2022/0263952 A1 | 8/2022 | Takeichi et al. | |
| 2022/0263954 A1 | 8/2022 | Takeichi et al. | |
| 2022/0294931 A1 | 9/2022 | Yamada et al. | |
| 2022/0294934 A1 | 9/2022 | Yamada et al. | |
| 2022/0303405 A1 | 9/2022 | Yamada et al. | |
| 2023/0139830 A1 * | 5/2023 | Kunieda | H04N 1/00846 358/475 |

* cited by examiner

| 0 | 0 | 0 | 0 | 0 | 0 | 0 | -10 |
|---|---|---|---|---|---|---|---|
| 0 | 0 | 0 | 0 | 0 | 0 | -10 | 0 |
| 0 | 0 | 0 | 0 | 0 | -10 | 0 | 0 |
| 0 | 0 | 0 | 0 | -10 | 0 | 0 | 0 |
| 0 | 0 | 0 | -10 | 0 | 0 | 0 | 0 |
| 0 | 0 | -10 | 0 | 0 | 0 | 0 | 0 |
| 0 | -10 | 0 | 0 | 0 | 0 | 0 | 0 |
| -10 | 0 | 0 | 0 | 0 | 0 | 0 | 0 |

MASK FOR CREATING PATTERN REPRESENTING 0

FIG.4A

| -10 | 0 | 0 | 0 | 0 | 0 | 0 | 0 |
|---|---|---|---|---|---|---|---|
| 0 | -10 | 0 | 0 | 0 | 0 | 0 | 0 |
| 0 | 0 | -10 | 0 | 0 | 0 | 0 | 0 |
| 0 | 0 | 0 | -10 | 0 | 0 | 0 | 0 |
| 0 | 0 | 0 | 0 | -10 | 0 | 0 | 0 |
| 0 | 0 | 0 | 0 | 0 | -10 | 0 | 0 |
| 0 | 0 | 0 | 0 | 0 | 0 | -10 | 0 |
| 0 | 0 | 0 | 0 | 0 | 0 | 0 | -10 |

MASK FOR CREATING PATTERN REPRESENTING 1

FIG.4B

PATTERN REPRESENTING 0

PATTERN REPRESENTING 1

| -10 | 0   | 0   | +10 | +10 | 0   | 0   | -10 |
|-----|-----|-----|-----|-----|-----|-----|-----|
| 0   | 0   | +10 | +10 | 0   | 0   | -10 | -10 |
| 0   | +10 | +10 | 0   | 0   | -10 | -10 | 0   |
| +10 | +10 | 0   | 0   | -10 | -10 | 0   | 0   |
| +10 | 0   | 0   | -10 | -10 | 0   | 0   | +10 |
| 0   | 0   | -10 | -10 | 0   | 0   | +10 | +10 |
| 0   | -10 | -10 | 0   | 0   | +10 | +10 | 0   |
| -10 | -10 | 0   | 0   | +10 | +10 | 0   | 0   |

MASK FOR CREATING CHANGES REPRESENTING 0

FIG.6A

| -10 | 0   | 0   | +10 | +10 | 0   | 0   | -10 |
|-----|-----|-----|-----|-----|-----|-----|-----|
| -10 | -10 | 0   | 0   | +10 | +10 | 0   | 0   |
| 0   | -10 | -10 | 0   | 0   | +10 | +10 | 0   |
| 0   | 0   | -10 | -10 | 0   | 0   | +10 | +10 |
| +10 | 0   | 0   | -10 | -10 | 0   | 0   | +10 |
| +10 | +10 | 0   | 0   | -10 | -10 | 0   | 0   |
| 0   | +10 | +10 | 0   | 0   | -10 | -10 | 0   |
| 0   | 0   | +10 | +10 | 0   | 0   | -10 | -10 |

MASK FOR CREATING CHANGES REPRESENTING 1

FIG.6B

PATTERN REPRESENTING 0

PATTERN REPRESENTING 1

EXTRACTED PATTERN

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | -5 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

PATTERN ENHANCEMENT MASK

PRINT PATTERN TO BE MULTIPLEXED

MULTIPLEXED PATTERN

|   |   |   |   |   |   |   | -10 |
|---|---|---|---|---|---|---|---|
| 0 | 0 | 0 | 0 | 0 | 0 | 0 | -10 |
| 0 | 0 | 0 | 0 | 0 | 0 | -10 | 0 |
| 0 | 0 | 0 | 0 | 0 | -10 | 0 | 0 |
| 0 | 0 | 0 | 0 | -10 | 0 | 0 | 0 |
| 0 | 0 | 0 | -10 | 0 | 0 | 0 | 0 |
| 0 | 0 | -10 | 0 | 0 | 0 | 0 | 0 |
| 0 | -10 | 0 | 0 | 0 | 0 | 0 | 0 |
| -10 | 0 | 0 | 0 | 0 | 0 | 0 | 0 |

MASK FOR CREATING CHANGES REPRESENTING 0

FIG.15A

| -10 | 0 | 0 | 0 | 0 | 0 | 0 | 0 |
|---|---|---|---|---|---|---|---|
| 0 | -10 | 0 | 0 | 0 | 0 | 0 | 0 |
| 0 | 0 | -10 | 0 | 0 | 0 | 0 | 0 |
| 0 | 0 | 0 | -10 | 0 | 0 | 0 | 0 |
| 0 | 0 | 0 | 0 | -10 | 0 | 0 | 0 |
| 0 | 0 | 0 | 0 | 0 | -10 | 0 | 0 |
| 0 | 0 | 0 | 0 | 0 | 0 | -10 | 0 |
| 0 | 0 | 0 | 0 | 0 | 0 | 0 | -10 |

MASK FOR CREATING CHANGES REPRESENTING 1

FIG.15B

| 0 | 0 | 0 | 0 | 0 | 0 | 0 | -5 |
|---|---|---|---|---|---|---|---|
| 0 | 0 | 0 | 0 | 0 | 0 | -5 | 0 |
| 0 | 0 | 0 | 0 | 0 | -5 | 0 | 0 |
| 0 | 0 | 0 | 0 | -5 | 0 | 0 | 0 |
| 0 | 0 | 0 | -5 | 0 | 0 | 0 | 0 |
| 0 | 0 | -5 | 0 | 0 | 0 | 0 | 0 |
| 0 | -5 | 0 | 0 | 0 | 0 | 0 | 0 |
| -5 | 0 | 0 | 0 | 0 | 0 | 0 | 0 |

MASK FOR CREATING CHANGES REPRESENTING 0
(LESS CHANGES THAN FIG. 15A)

FIG.15C

| -5 | 0 | 0 | 0 | 0 | 0 | 0 | 0 |
|---|---|---|---|---|---|---|---|
| 0 | -5 | 0 | 0 | 0 | 0 | 0 | 0 |
| 0 | 0 | -5 | 0 | 0 | 0 | 0 | 0 |
| 0 | 0 | 0 | -5 | 0 | 0 | 0 | 0 |
| 0 | 0 | 0 | 0 | -5 | 0 | 0 | 0 |
| 0 | 0 | 0 | 0 | 0 | -5 | 0 | 0 |
| 0 | 0 | 0 | 0 | 0 | 0 | -5 | 0 |
| 0 | 0 | 0 | 0 | 0 | 0 | 0 | -5 |

MASK FOR CREATING CHANGES REPRESENTING 1
(LESS CHANGES THAN FIG. 15B)

FIG.15D

SCHEMATIC DIAGRAM OF ELECTROPHOTOGRAPHIC MFP

SCHEMATIC DIAGRAM OF INKJET MFP

IMAGE PROCESSING APPARATUS AND METHOD FOR EMBEDDING SPECIFIC INFORMATION BASED ON TYPE OF DESIGNATED PRINTING APPARATUS

BACKGROUND OF THE INVENTION

Field of the Invention

The present invention relates to a technique for embedding information into a printed document.

Description of the Related Art

A technique for embedding management information at the time of printing an electronic document onto paper by an inkjet printing method has been known.

Japanese Patent Laid-Open No. 2000-299779 (hereinafter referred to as Document 1) discloses a technique for embedding inconspicuous information into a printed product by an inkjet method.

SUMMARY OF THE INVENTION

However, embedding by a non-inkjet printing method, such as an electrophotographic method, is not taken into consideration in Document 1. For this reason, in a case of performing same or similar processing by printing processes other than the inkjet method, the processing is performed with the same intensity as in the inkjet method. This makes it difficult to balance the accuracy of extraction and the inconspicuous image quality of embedded information.

An image processing apparatus according to one aspect of the present invention is an image processing apparatus for generating a printed document with specific information embedded therein, including: a first obtaining unit configured to obtain image data to be used in printing; a second obtaining unit configured to obtain the specific information; an acceptance unit configured to accept designation of a printing apparatus for executing printing; an embedding condition determination unit configured to determine a condition for embedding the specific information into the image data according to a type of the accepted printing apparatus; a multiplexed image generation unit configured to generate a multiplexed image by executing embedding of the specific information under the condition determined by the embedding condition determination unit; and a control unit configured to perform control such that the printing apparatus prints the multiplexed image.

Further features of the present invention will become apparent from the following description of exemplary embodiments with reference to the attached drawings.

BRIEF DESCRIPTION I/F THE DRAWINGS

FIGS. 4A and 4B are diagrams illustrating an example of masks;

FIGS. 6A and 6B are diagrams illustrating an example of masks;

FIGS. 15A to 15D are diagrams illustrating an example of masks;

DESCRIPTION I/F THE EMBODIMENTS

Embodiments of the technique of the present disclosure will be described using the drawings. Note that the following embodiments do not limit the invention according to the claims, and not all the combinations of the features described in these embodiments are necessarily essential for the solution provided by the invention.

Note that examples in which document ID information is used as embedded information will be described in the following embodiments. Also, examples in which an original is certified will be described specific modes of use. Terms in these examples are defined as below. In this specification, an "original" means an electronic document (digital document) registered and managed along with information indicating that its contents are genuine, and a "printed product of an original" means a printed product printed by using data of such an electronic document. Thus, for example, an official document issued by a government office, such as a "copy of a certificate of residence" as mentioned earlier, is a "printed product of an original". Also, a "copied product of an original" means a printed product obtained by copying a "printed product of an original" with an image processing apparatus having a copy function. Thus, for example, a photocopy of a "copy of a certificate of residence" mentioned above is a "copied product of an original". Note that the embodiments to be described below are not limited to the case of certifying an original but are applicable to multiplexing processes in general which involve embedding predetermined information in a sheet in such a form as to be make the information difficult to visually recognize for the user.

Embodiment 1

<System Configuration>

Figure 1:
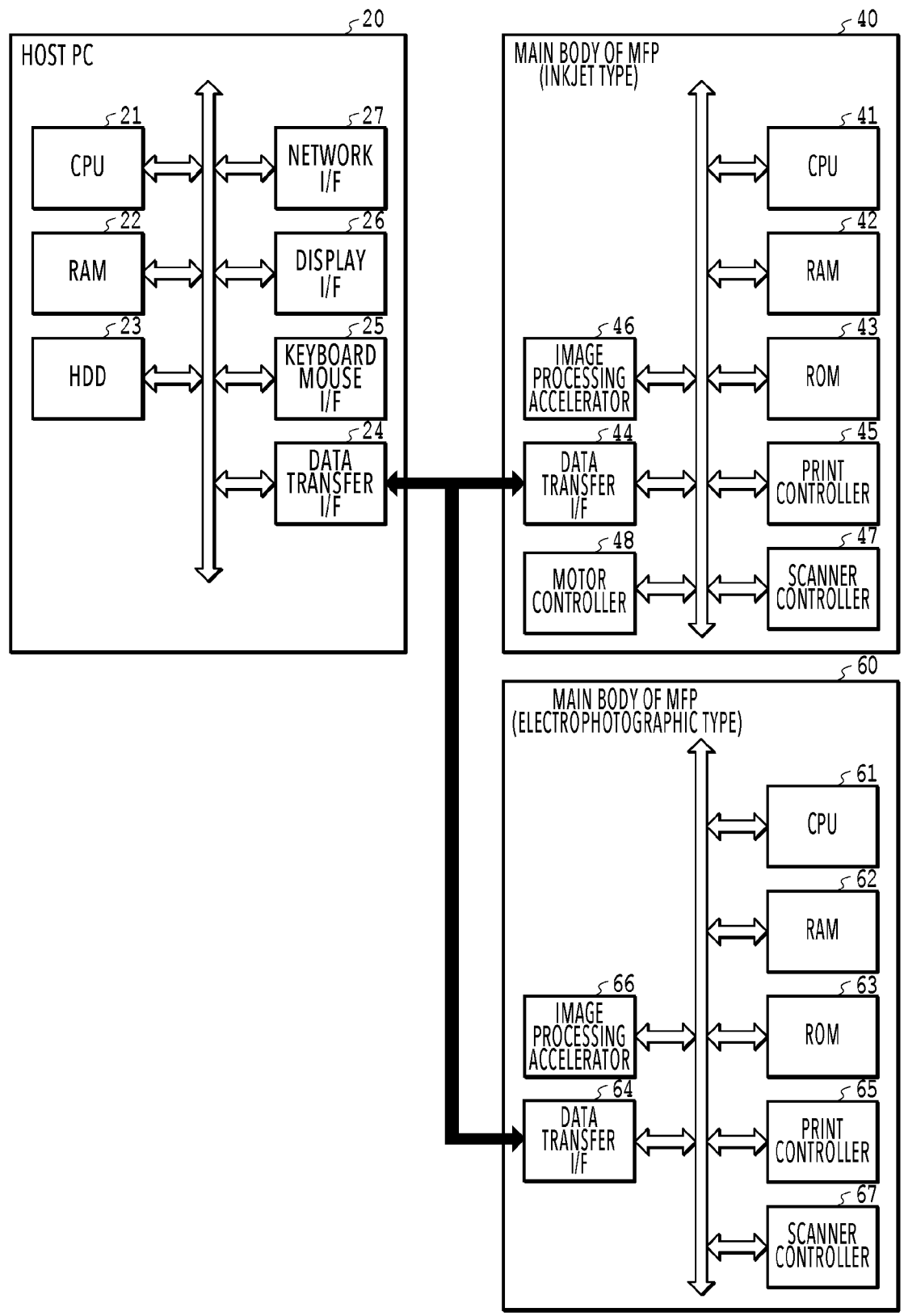
FIG. 1 is a diagram illustrating a system configuration.

FIG. 1 is a block diagram illustrating a configuration of a printing system according to the present embodiment. As illustrated in FIG. 1, this printing system has an MFP 40 and an MFP 60 as printing apparatuses and a PC 20 as a host apparatus. The MFP 40 has a plurality of functions such as a printer function and a scanner function and also has a copy function which involves combination of the two functions. The MFP 40 may further have the function of saving and sending image data to be printed and the function of sending and receiving faxes. In the following, hardware configurations of the MFP 40 and the PC 20 will be described.

Figure 18B:
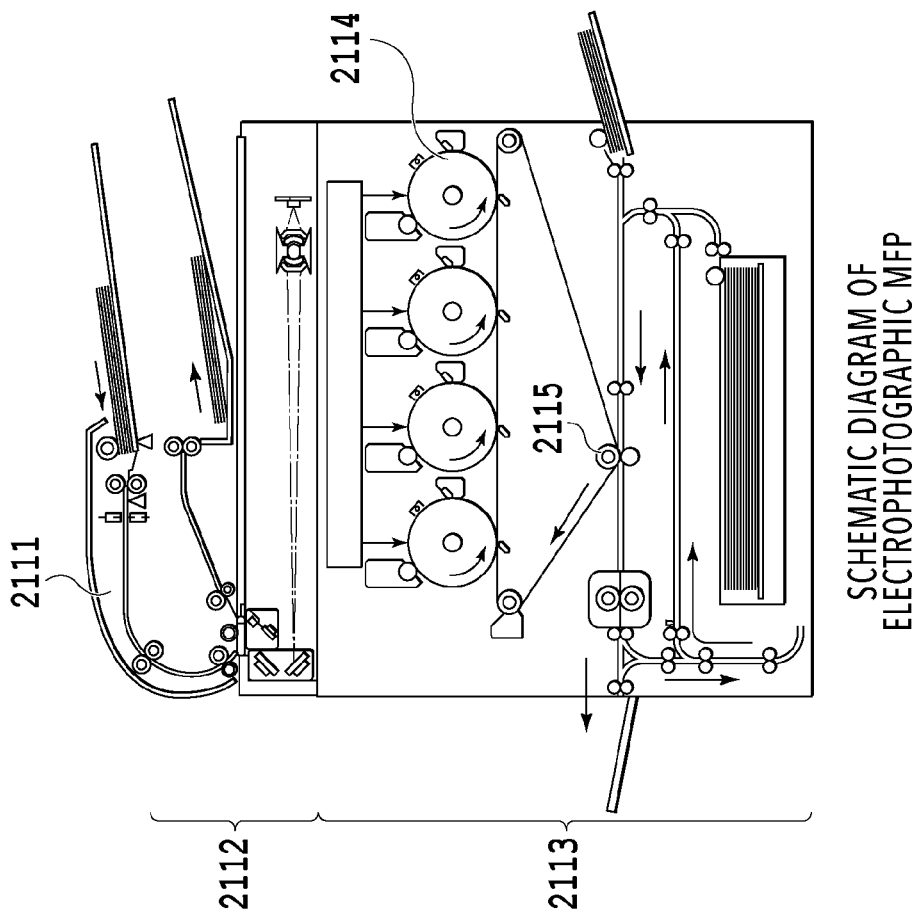
FIGS. 18A and 18B are schematic diagrams of inkjet- and electrophotographic-type multi-function printers (MFPs).
Figure 18A:
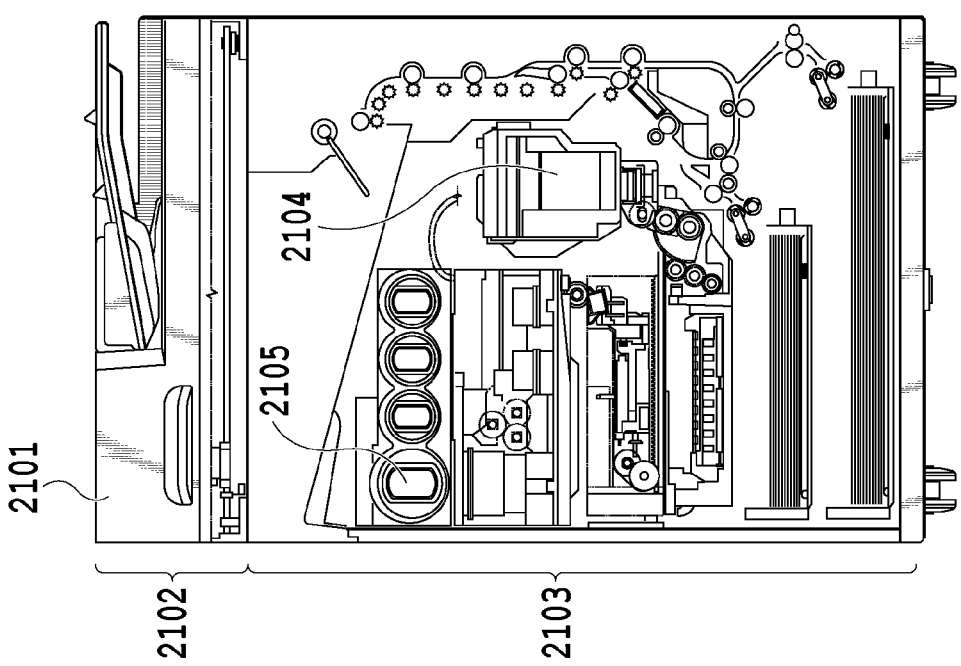

FIGS. 18A and 18B are exterior views of the MFPs. FIG. 18A illustrates a schematic diagram of the MFP 40, which is of an inkjet type, and FIG. 18B illustrates a schematic diagram of the MFP 60, which is an electrophotographic type. The MFP 40 employs an inkjet method as its printing method, and has a scanner part 2102 and a print part 2103. The print part 2103 has a print head 2104 and an ink tank unit 2105. The print head 2104 ejects inks according to print data. The ink tank unit 2105 stores the inks to be supplied to the print head 2104. The stored inks are cyan, magenta, yellow, and black inks. Depending on the model, an ink of a particular color or the like is separately held. The MFP 60 employs an electrophotographic method as its printing method, and has a scanner part 2112 and a print part 2113. Inside the print part 2113, there are photosensitive drums 2114 and a transfer roller 2115. The print unit 2113 holds a photosensitive drum 2114 for each ink color, and these are for cyan, magenta, yellow, and black, respectively. Latent images are formed on the photosensitive drums according to print data. The transfer roller 2115 transfers the formed latent images onto a conveyed sheet to perform a printing process.

The main body of the MFP 40, which employs an inkjet method as its printing method, includes the following elements as main elements. A CPU 41 is an arithmetic processing device that comprehensively controls the entire MFP 40, and executes, for example, a copying process and so on to be described later in accordance with programs held in a ROM 43 and a RAM 42. The RAM 42 is a volatile storage and temporarily holds programs and data. The ROM 43 is a non-volatile storage and holds table data and programs to be used in various processes to be described later. A data transfer interface (DATA TRANSFER I/F) 44 controls sending and receiving of data to and from the MFP 60 and the PC 20. A print controller (PRINT Controller) 45 controls the heating operation of a heater mounted on the print head not illustrated and ejects the inks based on print data. An image processing accelerator (Image Processing Accelerator) 46 is an arithmetic processing device capable of executing image processing at a higher speed than the CPU 41 does. Note that the image processing accelerator 46 is not necessarily essential. Depending on the printer's specifications and the like, the above-described table parameter creation process and image processing may be executed solely by processing by the CPU 41. A scanner controller (SCANNER Controller) 47 performs operations such as controlling the lighting of an LED mounted on a scanner unit not illustrated, obtaining information on the amount of light from the scanner unit, and controlling write to the RAM 42. In this way, an image of a document set on a platen glass not illustrated is read. A motor controller (MOTOR Controller) 48 controls a plurality of motor units not illustrated to, for example, move the print head relative to a print sheet and move the scanner unit relative to a document.

The main body of the MFP 60, which employs an electrophotographic method as its printing method, has a similar configuration to that of the main body of the MFP 40, which employs an inkjet method, but the printing device part is different. A print controller (PRINT Controller) 65 performs a printing process by developing images on the drum surfaces and transferring them according to print data based on control parameters from predetermined addresses in a RAM 62. Note that the configurations of the MFPs 40 and 60 are not limited to the illustrated ones and may, for example, include a network interface that connects to an external network and communicates with other external PCs or the like.

The PC 20 includes the following elements as main elements. A CPU 21 is an arithmetic processing device that comprehensively controls the entire PC 20, and executes, for example, an original printing process and so on to be described later in accordance with programs held in an HDD 23 and a RAM 22. The RAM 22 is a volatile storage and temporarily holds programs and data. The HDD 23 is a non-volatile storage and likewise holds programs and data. A data transfer interface (DATA TRANSFER I/F) 24 controls sending and receiving of data to and from the MFPs 40 and 60. As a connection method for this sending and receiving of data, a wired connection using USB, IEEE 1394, a LAN, or the like or a wireless connection using Bluetooth or Wi-Fi is usable. A keyboard-mouse interface (KEY BOARD MOUSE I/F) 25 is an interface that controls human interface devices (HIDs), such as a keyboard and a mouse. A display interface (DISPLAY I/F) 26 performs display control on a display not illustrated. A network interface (Network I/F) 27 connects the PC 20 to an external network, and communicates with one or more external PCs to perform operations such as issuing a request to perform document ID matching, requesting its result, and requesting document data.

<Original Printing Process>

Next, a flow of printing an electronic document which is an original will be described with reference to the flowchart of FIG. 2. The series of processes illustrated in the flowchart of FIG. 2 starts in response to the user selecting an electronic document to be printed and issuing an instruction to perform printing including embedding information indicating genuineness of the electronic document via a user interface (UI) of a predetermined printing application installed in the PC 20. Note that each symbol "S" in the following description means a step.

In S201, data of the electronic document designated as a printing target is obtained. In the present embodiment, electronic documents of various originals are stored and managed in an external PC not illustrated. Via the network interface 27, the PC 20 sends a request to obtain the particular electronic document to the external PC, and receives and obtains data for printing the designated electronic document, specifically PDL data, from the external PC. Here, PDL stands for Page Description Language and is formed of a set of page-by-page draw commands. The definitions of types of draw commands vary depending on the PDL specification. In the present embodiment, mainly the following three types are exemplarily used.

TEXT draw command: (X1, Y1, color, font information, character string information)

BOX draw command: (X1, Y1, X2, Y2, color, applied shape)

IMAGE draw command: (X1, Y1, X2, Y2, image file information)

Besides the above three types, there are a DOT draw command to draw dots, a LINE draw command to draw a line, a CIRCLE draw command to draw an arc, and the like, and these draw commands are used depending on the application. Frequently and generally used PDLs include Portable Document Format (PDF) proposed by Adobe Inc., XPS proposed by Microsoft Corporation, HP-GL/2 proposed by Hewlett-Packard Company, and so on.

Figure 3:
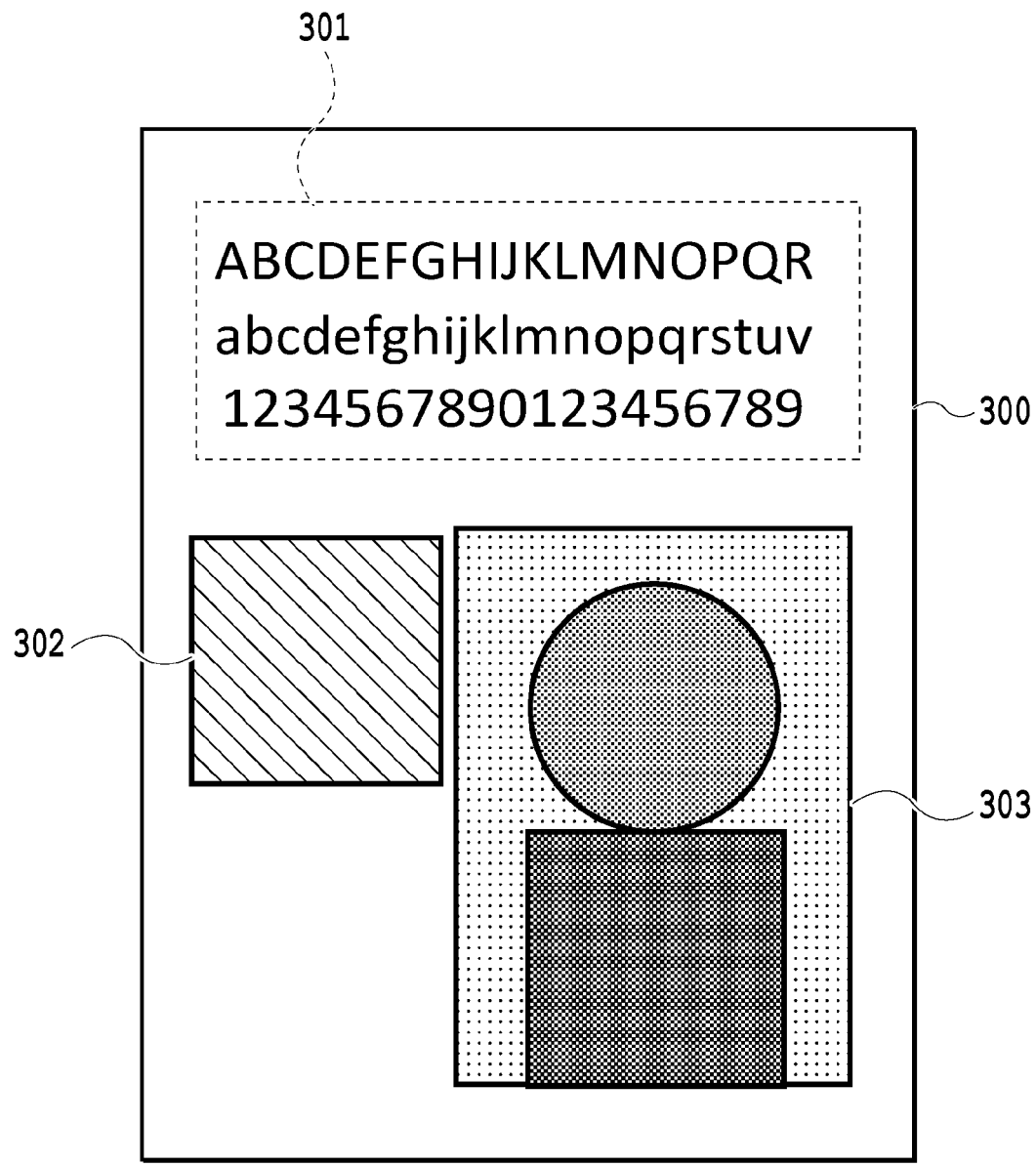
FIG. 3 is a diagram illustrating an example of a page image.

FIG. 3 is a diagram illustrating an example of an image of one page of an electronic document (hereinafter referred to as "page image"). Now, suppose that the size of a page image 300 illustrated in FIG. 3 is 600 pixels in width and 900 pixels in height. The following is a PDL corresponding to the page image 300.

```
<PAGE=001>
    <TEXT> 50,50, 550, 100, BLACK, STD-18,
        "ABCDEFGHIJKLMNOPQR" </TEXT>
    <TEXT> 50,100, 550, 150, BLACK, STD-18,
        "abcdefghijklmnopqrstuv" </TEXT>
    <TEXT> 50,150, 550, 200, BLACK, STD-18,
        "1234567890123456789" </TEXT>
    <BOX> 50, 300, 200, 450, GRAY, STRIPE </BOX>
    <IMAGE> 250, 300, 550, 800, "PORTRAIT.jpg" </IMAGE>
</PAGE>
```

<PAGE=001> in the first line of the above PDL is a tag indicating the number of pages. Usually, PDLs are designed to be capable of describing a plurality of pages, and a tag indicating page partition is written in a PDL. The above example indicates that a section down to </PAGE> in the ninth line is the first page. In a case where there is a second page, <PAGE=002> is written. From <TEXT> in the second line to </TEXT> in the third line is a TEXT draw command. In the TEXT draw command, the first two coordinates indicate the coordinates (X1, Y1) of the upper left corner of a drawing region, and the subsequent two coordinates indicate the coordinates of (X2, Y2) of the lower right corner of the drawing region. The subsequent part of the second line describes "BLACK (black color: R=0, G=0, B=0)" as the color, "STD (standard")" as the character font, 18 as the character size, and "ABCDEFGHIJKLMNOPQR" as a character string to be drawn. From <TEXT> in the fourth line to </TEXT> in the fifth line and from <TEXT> in the sixth line to </TEXT> in the seventh line are TEXT draw commands as well. The character strings to be drawn are "abcdefghijklmnopqrstuv" and "1234567890123456789". From <BOX> to </BOX> in the eighth line is a BOX draw command, in which the first two coordinates indicate the coordinates (X1, Y1) of the upper left corner as the point to start the drawing, and the subsequent two coordinates indicate the coordinates (X2, Y2) of the lower right corner as the point to end the drawing. Next, "GRAY (gray color: R=128, G=128, B=128)" is designated as the color, and "STRIPE (stripe pattern)" is designated as the pattern to be applied. The ninth line is an IMAGE draw command. The first two coordinates indicate the coordinates (X1, Y1) of the upper left corner of a drawing region, and the subsequent two coordinates indicate the coordinates of (X2, Y2) of the lower right corner of the drawing region. Moreover, "PORTRAIT.jpg" is described as the file name of an image to be present in the designated drawing region. Note that ".jpg" is an identifier and indicates that the file is in JPEG, a commonly used image compression format. Finally, </PAGE> in the 10th line is a description indicating the end of the drawing of the page. Note that document data to be actually obtained is often a combination of PDL data and font data and an image file(s) added thereto. This is because, in a case of separately managing the font data and the image file(s), the text and image portions cannot be formed only with draw commands and there is not enough information to form the image(s) to be printed. In S201, document data including PDL data as described above is obtained by accessing an external PC.

In S202, information indicating genuineness of the electronic document to be printed is obtained. In the present embodiment, via the network interface 27, the PC 20 sends a request to obtain the information indicating the genuineness of the electronic document to the above external PC and receives and obtains the information therefrom. Here, document ID information is used as the information indicating the genuineness of the electronic document. The document ID information is information with a predetermined number of bits (32 bits in the present embodiment) calculated based on the above document data (data in which PDL data, font data, are an image file(s) are combined) by using a hash function. If even one byte of digital data forming an electronic document is changed, different document ID information is calculated. Thus, a singe electronic document is associated with a unique document ID. Note that a plurality of external PCs may cooperate with each other to store and manage electronic document files and their document ID information, and a system configuration like a blockchain may be employed. This reduces the risk of alteration of the document ID information. Incidentally, in a case where the PC 20 has an enough resource to manage document ID information within the PC 20, it is also possible to perform a matching process internally.

In S203, a rendering process is executed based on the document data obtained in S201. In this rendering process, each draw command contained in the PDL data is executed to generate bitmap image data including color information of each pixel. For example, in the case of the page image 300 in FIG. 3 mentioned above, a 600×900 pixel bitmap image is generated. In the present embodiment, each pixel of the bitmap image has 8-bit or 256 levels for each of R, G, and B.

In S204, a process of embedding the document ID information obtained in S202 into the bitmap image generated in S203 is executed. The process of embedding the document ID information into the bitmap image is called "multiplexing process", "multiplexing encoding process", or the like. In a case of copying a printed product obtained by printing the bitmap image subjected to this multiplexing process, it is possible to extract (decode) the document ID information from the scanned image of the printed product and determine whether the printed product to be copied is a "printed product of an original".

Handling information on an information processing apparatus such as the PC 20 essentially means handling binary data. Binary data is information expressed with a combination of "0" and "1", and information of this "0" and/or "1" is connected in a sequence to have a specific meaning. For example, in a case of handling the English word "hello" with binary data in, for example, Shift JIS, which is one of character encodings, the alphabetical character "h" corresponds to binary data "01101000". Similarly, "e" corresponds to binary data "01100101", "l" corresponds to binary data "01101100", and "o" corresponds to binary data "01101111". That is, the character string "hello" can be expressed with binary data "0110100001100101011 01100110110001101111". In other words, if binary data "01101000011001010110110001101111" can be obtained, text information representing the English word "hello" can be obtained. Based on this idea, multiplexing can be implemented by embedding predetermined data in an image such that "0" and/or "1" can be determined.

<Multiplexing Process>

FIGS. 4A and 4B are an example of masks formed of 8×8 pixels each used to generate "0" or "1". FIG. 4A is a mask for generating "0", and FIG. 4B is a mask for generating "1". By adding the values in the masks to the pixel values in a bitmap image, it is possible to provide a periodic pattern in 8×8 pixel regions in the image. As mentioned above, a bitmap image in the present embodiment is expressed with 8 bits per color, and each pixel is given one of values of 0 to 255. Values outside the range of 0 to 255 cannot be used as image data. Thus, in a case where the addition results in a value less than 0 or more than or equal to 256, the value of the sum is usually replaced with 0 or 255 to be within the effective range. The masks in FIGS. 4A and 4B give changes of "−10" and "0". In a case where the pixel values of a region in a bitmap image to be masked are all "0", the values in that region will be all "0". Note that a case of using 8 bits per color is described here, but the number of bits is not limited to this number. In a case of handling digital images, there is always an effective range regardless of the number of bits to be used to express them, and it is impossible to apply such a change as to bring pixel values outside the range.

Figure 5A:
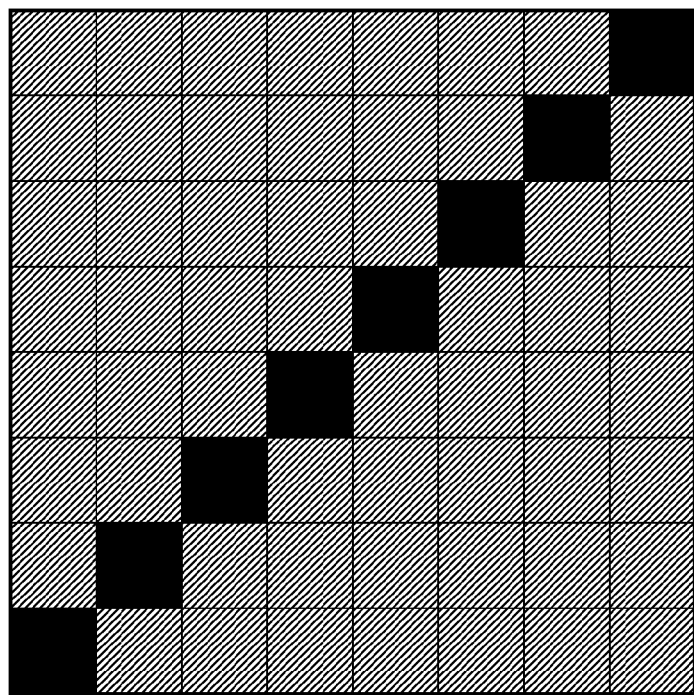
FIGS. 5A and 5B are diagrams illustrating patterns formed by the masks.
Figure 5B:
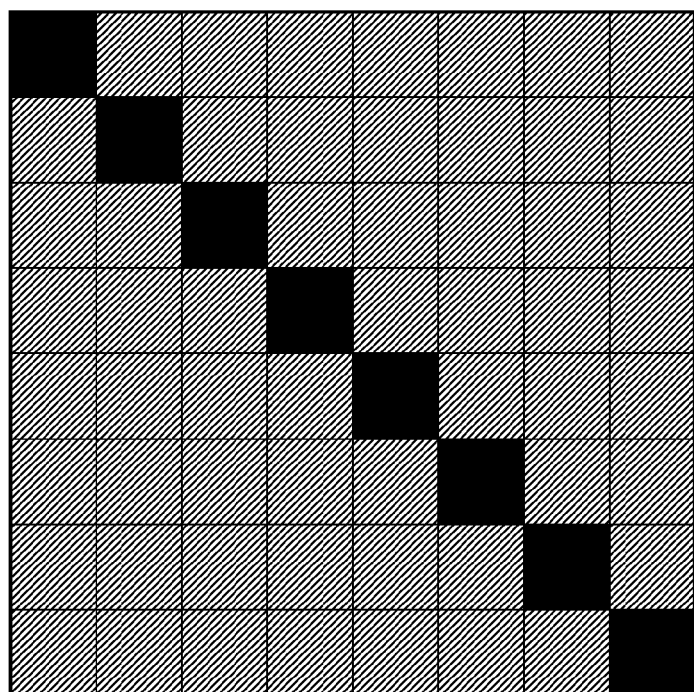

FIGS. 5A and 5B are diagrams visually illustrating the patterns to be formed in a bitmap image with the masks in FIGS. 4A and 4B mentioned above. The positions of "−10" in the masks in FIGS. 4A and 4B are expressed with solid black, and the positions of "0" are expressed with hatching. As can be seen from FIGS. 5A and 5B, in the bitmap image after the masks are applied, a diagonal line extending downward to the left appears as a "pattern representing 0" and a diagonal line extending downward to the right appears as a "pattern representing 1".

Here, the following represents pseudocode for alternately applying the mask in FIG. 4A and the mask in FIG. 4B to an entire bitmap image.

```
01:    int i, j, k, l;
02:    int width = 600, height=900;
03:    unsigned char *data = image data;
04:    int **maskA = mask data;
05:    bool isMaskA = true;
06:    for(j = 0; j<height; j+=8){
07:      for(i = 0; i<width; i+=8){
08:        for(k = 0; k<8; k++){
09:          for(l = 0; l<8; l++){
10:            if(isMaskA == true){
11:              data[(i+k)+(j+l)*width] += maskA[k][l];
12:            }
13:          }
14:        }
15:      }
16:    }
```

In the present embodiment, the embedding of pattern data described above is performed only on the B value in the RGB value of each pixel in the bitmap image. This is because, in the case of performing printing on a paper white region of a sheet with the four kinds of inks, or the C, M, Y, and K inks, the Y ink is less visible than the other C, M, and K inks. In the multiplexing, it is preferable to minimize the impact of the above pattern to be embedded on the original image, that is, to make the pattern as less visible as possible. R, G, and B, which are the three primary colors of light, and C, M, and Y, which are the three primary colors of pigment, are related as complementary colors such that R and C, G and M, and B and Y are pairs with opposite hues. This means that modulating the B value in an RGB value greatly changes the amount of the Y ink to be used. Thus, in the present embodiment, the density of the Y ink is controlled to change greatly by modulating only the B value in the RGB value.

Figure 7A:
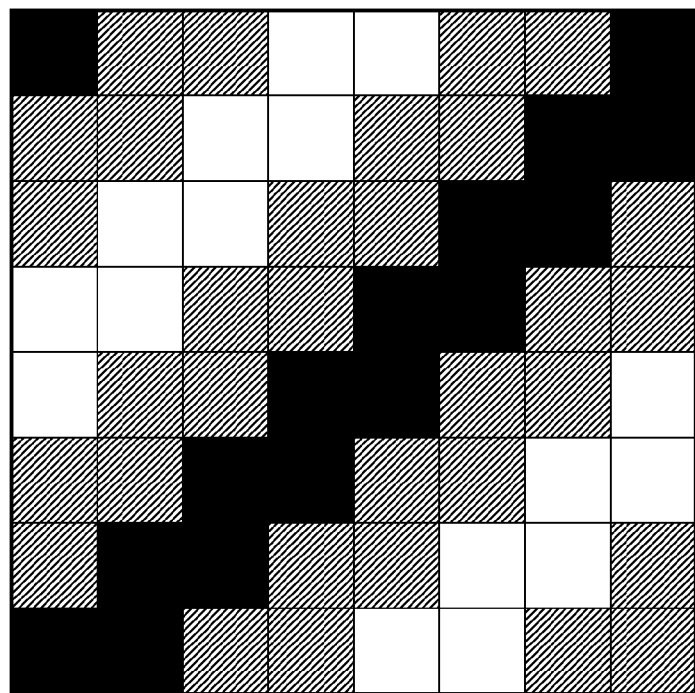
FIGS. 7A and 7B are diagrams illustrating patterns formed by the masks.
Figure 7B:
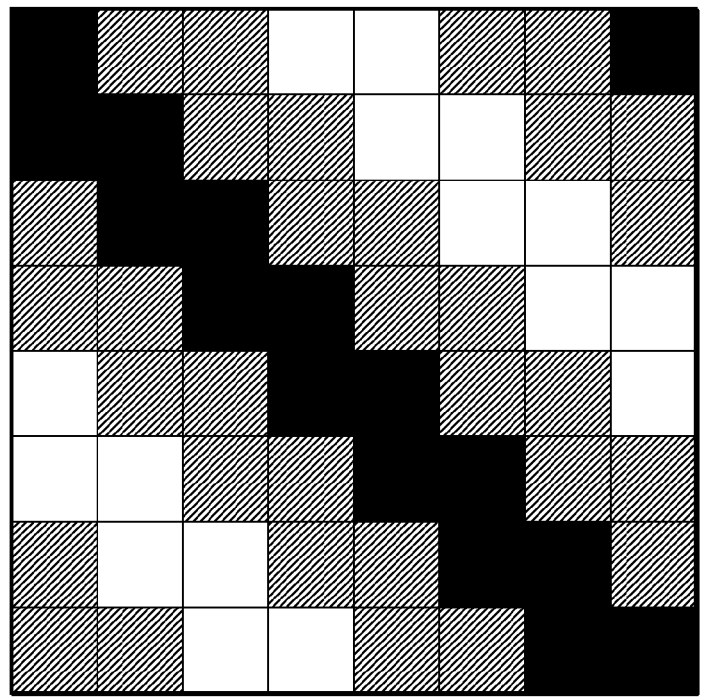

Here, in the case of the above-mentioned page image 300 illustrated in FIG. 3, there is a sufficiently large paper white region. The region other than a TEXT drawing region 301, a BOX drawing region 302, and an IMAGE drawing region 303 is the paper white region. In this case, with the masks illustrated in FIGS. 4A and 4B, the pattern data sometimes cannot be embedded well in all drawing regions other than the paper white region. For example, a solid black (R=0, G=0, B=0) drawing region will be the same solid black (R=0, G=0, B=0) region even after the embedding. Thus, it is preferable to, for example, apply masks as illustrated in FIGS. 6A and 6B in a case of embedding pattern data into a non-paper white region, in particular, an image drawing region. The masks in FIGS. 6A and 6B are masks that apply changes of "−10", "0", and "+10" to the pixels in a bitmap image. With the masks in FIGS. 6A and 6B, even in a case where the pixel values of a region in a bitmap image to be masked are all "0", the pixel values in this region will be "0" or "+10". In this way, pattern data can be embedded into all pixels in a bitmap image. FIGS. 7A and 7B are diagrams visually illustrating the patterns to be applied to a bitmap image with the masks in FIGS. 6A and 6B. The positions of "−10" in the masks in FIGS. 6A and 6B are expressed with solid black, the positions of "0" are expressed with hatching, and the positions of "+10" are expressed with solid white. As can be seen from FIGS. 7A and 7B, in the bitmap image after the masks are applied, a plurality of diagonal lines differing in density and extending downward to the left appear as a "pattern representing 0", and a plurality of diagonal lines differing in density and extending downward to the right appears as a "pattern representing 1". Note that, it is preferable to apply the masks in FIGS. 4A and 4B to TEXT drawing regions and BOX drawing regions since the proportion of a paper white region is usually likely to be large in these drawing regions. However, there are cases where it is preferable to apply the masks in FIGS. 6A and 6B to TEXT drawing regions and BOX drawing regions depending on the designated color, weight of characters, and so on. Also, even an IMAGE drawing region can sometimes be very similar to a paper white region. For this reason, the type of masks to be applied may be determined by, for example, obtaining a density histogram of each drawing region. For example, the masks in FIGS. 4A and 4B may be applied in a case where the largest RGB value is more than a threshold value, and the masks in FIGS. 6A and 6B may be applied in a case where the largest RGB value is less than or equal to the threshold value. Alternatively, in a case where the input color space is L*a*b*, the masks to be applied may be switched by comparing the L* value, which indicates luminance, with a threshold value. In this way, it is possible to implement reliable embedding.

Figure 2:
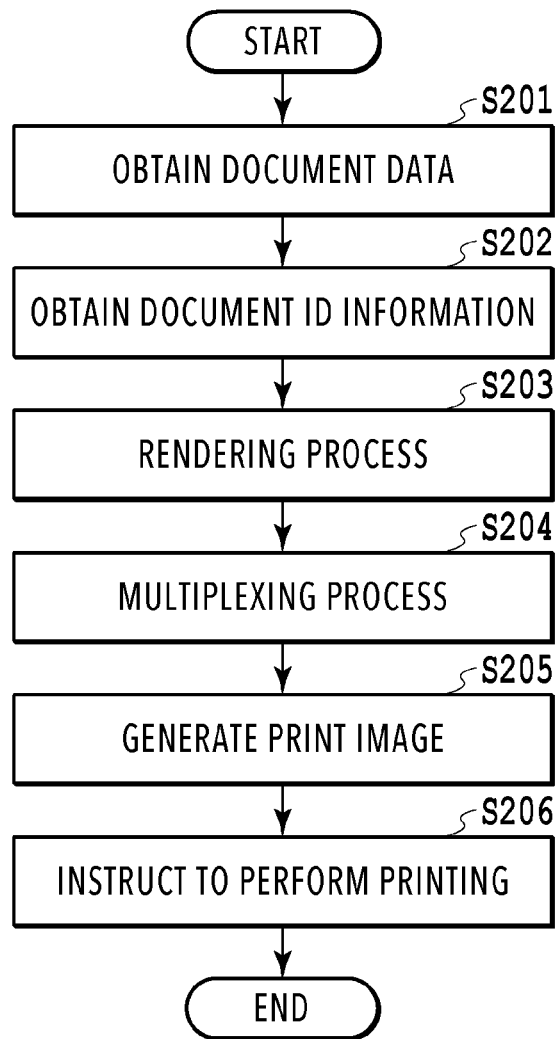
FIG. 2 is a flowchart illustrating a flow of printing a printed document of an original.

The description now returns to the flowchart of FIG. 2.

In S205, a print image is generated based on the multiplexed bitmap image generated in S204 (hereinafter referred to as "multiplexed image"). A publicly known method may be used for the generation of this print image. In the present embodiment, processes including a color conversion process, a color separation process, an output characteristic conversion process, and a quantization process are performed on each pixel of the multiplexed image. Each process will now be described.

(Color Conversion Process)

The color conversion process is a process of converting the pixel values (RGB values) of the multiplexed image such that the pixel values can be suitably reproduced on the MFP 40. Color values typically designated in PDL draw commands are color values set to be suitably expressed on displays. If those values are directly output to a printer, colors are output with different tonality from that viewed on a display. Thus, a color conversion process of absorbing this color difference is performed. In this color conversion process, a three-dimensional lookup table (LUT) is used in which combinations of input pixel values (Rin, Gin, Bin) in the multiplexed image are associated with suitable combinations of output pixel values (Rout, Gout, Bout). Now, Rin, Gin, and Bin, which are input values, each have 256 levels. It is therefore ideal to prepare a table having 256×256×256 or a total of 16,777,216 sets of output values (Rout, Gout, Bout) shown below (Table1[256][256][256][3]).

$R\text{out}=\text{Table1}[R\text{in}][G\text{in}][B\text{in}][0]$ $G\text{out}=\text{Table1}[R\text{in}][G\text{in}][B\text{in}][1]$ $B\text{out}=\text{Table1}[R\text{in}][G\text{in}][B\text{in}][2]$ Note that a publicly known technique to reduce the table size may be used, such as reducing the number of LUT grids from 256 to, for example, 16 and interpolating the table values between the grids to determine output values between the grids.
(Color Separation Process)

The color separation process is a process of converting Rout, Gout, and Bout, which are the output values of the color conversion process, into output values of the ink colors to be used to perform inkjet printing on a sheet (here, the four colors of C, M, Y, and K). There are various methods to implement this color separation process as well. In the present embodiment, a three-dimensional lookup table (Table2[256][256][256][4]) is used in which the combinations of output pixel values (Rout, Gout, Bout) mentioned above are associated with combinations of the following ink-color pixel values (C, M, Y, K).

$C=\text{Table2}[R\text{out}][G\text{out}][B\text{out}][0]$ $M=\text{Table2}[R\text{out}][G\text{out}][B\text{out}][1]$ $Y=\text{Table2}[R\text{out}][G\text{out}][B\text{out}][2]$ $K=\text{Table2}[R\text{out}][G\text{out}][B\text{out}][3]$ In this case, it is preferable that only the Y value in a CMYK value corresponding to the result of the modulation of a paper white region in the multiplexing process in S204 have a value above 0. More specifically, the CMYK value of a region whose pixel value has been converted from R=255, G=255, and B=255 to R=255, G=255, and B=245 is preferably such that the Y value is above 0 and the C, M, and K values are less than the Y value and close to 0. This is because it is desired to lower the visibility of the pattern to be embedded, as described in S204. Note that a publicly known technique to reduce the table size may be used, as with the case of the above color conversion process.
(Output Characteristic Conversion Process)

The output characteristic conversion process is a process of converting the density of each of the ink colors C, M, Y, and K into a print dot number ratio. Specifically, for example, the 256-level density of each color is converted into a 1024-level print dot number ratio of the color. In this output characteristic conversion process, one-dimensional lookup tables (Table3[4][256]) are used in which the following print dot number ratios (Cout, Mout, Yout, Kout) corresponding to the densities of the respective ink colors are set.

$C\text{out}=\text{Table3}[0][C]$ $M\text{out}=\text{Table3}[1][M]$ $Y\text{out}=\text{Table3}[2][Y]$ $K\text{out}=\text{Table3}[3][K]$ Note that a publicly known technique to reduce the table size may be used, as with the case of the above color conversion process and color separation process.
(Quantization Process)

The quantization process is a process of converting the above print dot number ratio of each ink color (Cout, Mout, Yout, Kout) into the following quantized value (Cdot, Mdot, Ydot, Kdot) indicating whether to print or not to print a dot for each pixel.

$C\text{dot}=\text{Halftone}[C\text{out}][x][y]$ $M\text{dot}=\text{Halftone}[M\text{out}][x][y]$ $Y\text{dot}=\text{Halftone}[Y\text{out}][x][y]$ $K\text{dot}=\text{Halftone}[K\text{out}][x][y]$ The above are quantized values for dithering. For each pixel position, it is possible to obtain a value indicating whether to print or not to print a dot for each ink color by comparing a threshold value in a dither matrix corresponding to the pixel position. Here, the probability of generation of a print dot of each color is Cout/1023, Mout/1023, Yout/1023, or Kout/1023. Note that the method of the quantization process is not limited to dithering and may be another method such as error diffusion, for example.

By sequentially executing the above-described processes, a print image is generated from the multiplexed image. The description now returns to the flowchart of FIG. 2.

In S206, the data of the print image generated in S205 is sent to the MFP 40 or another printer not illustrated along with an instruction to print the print image, and the destination printer executes a printing process.

The above is a flow until a printed product of an original is generated. Note that, in the present embodiment, the B value in the RGB value is modulated in the multiplexing process (S204), but the CMYK value may be modulated. In this case, it is necessary to use a positive value for the modification since the pixel value of a paper white region is Y=0, M=0, C=0, and K=0. In the case of the masks exemplarily illustrated in FIGS. 4A and 4B and FIGS. 6A and 6B mentioned above, the sign of the modulation values in the masks may be reversed, that is, "−10" may be reversed to "+10" and "+10" may be reversed to "−10". Modulating the CMYK value as above increases controllability for limiting the ink to be applied to a paper white region to the Y ink. On the other hand, modulating the RGB value increases controllability for suppressing changes in hue at the time of embedding pattern data into an image drawing region. Thus, it is preferable to select an appropriate modulation method according to characteristics of the printing process, such as electrophotographic printing or inkjet printing, the ratio of the paper white region, the text region, and the image region in the page image to be printed, and so on.
<Process of Copying "Printed Product of Original">

Next, a flow of copying a "printed product of an original" being the product of the above-described original printing process with the MFP 40 will be described with reference to the flowchart of FIG. 8. The series of processes illustrated in the flowchart of FIG. 8 starts in response to the user setting a printed product of an original on the platen glass not illustrated and issuing a copy instruction via a UI of the MFP 40. Note that each symbol "S" in the following description means a step.

First, in S811, the printed product to be copied set on the MFP 40 is read by the incorporated scanner unit (not illustrated). This reading of the printed product involves applying LED light to the printed product placed on the platen glass and converting the reflected light into analog electrical signals with imaging elements, such as CCDs, facing the pixels.

In next S812, the analog electrical signals obtained in S811 are digitalized to obtain a bitmap image with an RGB color space. In this step, image processing including a modulation transfer function (MTF) correction process, an input correction process, a shading correction process, a color conversion process, etc. is performed on the pixels of the bitmap image. Each process will now be described.

<<MTF Correction Process>>

The MTF correction process is a correction process related to resolution among the scanner unit's reading characteristics. In a case of optically reading an image with the scanner unit, the image gets defocused due to displacement from the focused position, the performance limit of the lens itself, and so on. For this reason, the image is fixed to some extent by a filtering process or the like. Here, performing an enhancement process that is so strong as to completely fix the image causes exaggeration of blown-out highlights, image noise, and dust pixels, and the like, thereby making image defects more conspicuous than the actual image. The filtering strength therefore needs to be designed such that the image quality improvement and defects are balanced. The following are an example of edge enhancement filters that increase the pixel value of a center portion of an image by a factor of 5 and decrease the pixel values on the upper, lower, left, and right sides by a factor of −1.

$$R'[x][y]=R[x][y]\times 5-R[x-1][y]-R[x+1][y]-R[x][y-1]-R[x][y+1]$$

$$G'[x][y]=G[x][y]\times 5-G[x-1][y]-G[x+1][y]-G[x][y-1]-G[x][y+1]$$

$$B'[x][y]=B[x][y]\times 5-B[x-1][y]-B[x+1][y]-B[x][y-1]-B[x][y+1]$$

(Input Correction Process)

The input correction process is a process of converting the output value of each CCD (imaging element), which is originally a photon quantity, into lightness matching the sensitivity of the human eyes. In this way, for example, an R'G'B' signal having 4096 levels for each color is converted into a color intensity value having 1024 levels for each color (R", G", B"). In this conversion, the following one-dimensional lookup tables (Table4[4][4096]) are used in which suitable print dot number ratios are set for densities of the respective ink colors.

$$R''=\text{Table4}[0][R']$$

$$G''=\text{Table4}[1][G']$$

$$B''=\text{Table4}[2][B']$$

Note that a publicly known technique to reduce the table size may be used, such as reducing the number of LUT grids from 4096 to, for example, 256 and interpolating the table values between the grids to determine output values between the grids.

(Shading Correction Process)

The shading correction process is a process of reducing color and density unevenness caused by the difference in reading sensitivity between pixel positions resulting from the manufacturing variation and assembly variation of constituent parts of the scanner device, such as its lens, LED, and CCDs. For example, an R"G"B" signal having 1024 levels for each color is converted into a color intensity value having 256 levels for each color (R'", G'", B'"). In this conversion, the following one-dimensional lookup tables (Table5[x][3][1024]) are used in which a density adjustment value is specified for each pixel position in an X direction (the direction along which the scanner lens is disposed).

$$R'''=\text{Table5}[x][0][R'']$$

$$G'''=\text{Table5}[x][1][G'']$$

$$B'''=\text{Table5}[x][2][B'']$$

Note that a publicly known technique to reduce the table size may be used, as with the case of the above input correction process.

(Color Conversion Process)

The color intensity value having 256 levels for each color (R'", G'", B'") calculated by the above processes so far is a set of values specific to the scanner unit, as opposed to the color conversion process performed in the printing. The color conversion process performed here is a process of converting the value specific to the scanner unit into an RGB value (values Rout, Gout, and Bout) suitable for displaying the specific values on a display. Now, R'", G'", and B'", which are the input values, each have 256 levels. Thus, in this conversion, the following three-dimensional lookup table (Table6[256][256][256][3]) having 256×256×256 or a total of 16,777,216 sets of output values is used.

$$\text{Rout}=\text{Table1}[R'''][G'''][B'''][0]$$

$$\text{Gout}=\text{Table1}[R'''][G'''][B'''][1]$$

$$\text{Bout}=\text{Table1}[R'''][G'''][B'''][2]$$

Note that a publicly known technique to reduce the table size may be used, as with the case of the above input correction process and shading correction process. The bitmap image is obtained in this manner.

In next S813, a document ID information extraction process is executed on the bitmap image obtained in S812. Specifically, a process is performed in which whether a pattern representing "0" or "1" as mentioned earlier is formed in the bitmap image is determined in units of a predetermined region (here, 8×8 pixels), and number sequence information represented by "0" and "1" is taken out. By repeating this across the entire bitmap image, the document ID information embedded by the multiplexing process at the time of printing the original is decoded. The information embedded by the multiplexing process may be called "embedded information" or "multiplexed information". The process of decoding the embedded information will now be specifically described.

(Process of Decoding Embedded Information)

Figure 9:
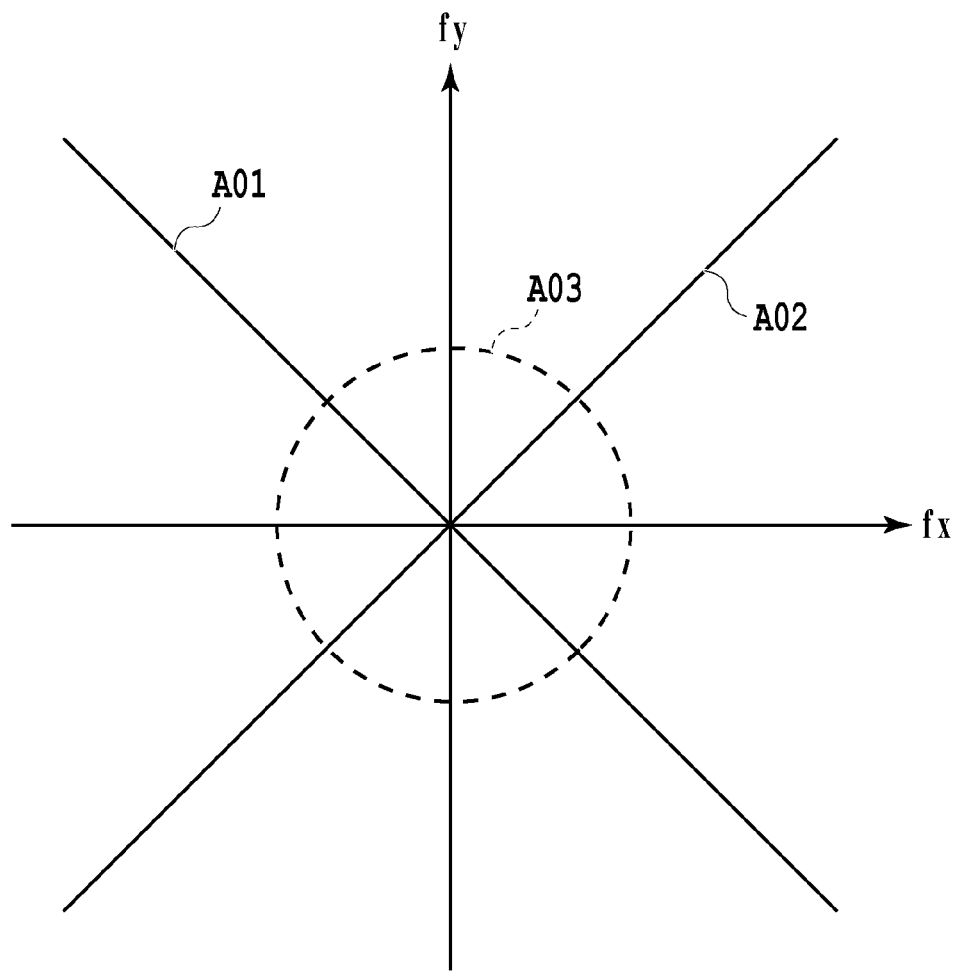
FIG. 9 is a diagram illustrating spatial frequency characteristics of patterns used in embedding.

First, the position where the embedded information is embedded in the obtained bitmap image is detected. The embedded position can be detected by analyzing spatial frequency characteristics of each unit region (here, 8×8 pixel region). FIG. 9 is a diagram illustrating spatial frequency characteristics of patterns used in embedding. The horizontal axis represents frequencies in the horizontal direction while the vertical axis represents frequencies in the vertical direction. The farther from the origin, the higher the frequency. In the present embodiment, two types of patterns corresponding respectively to "0" and "1" have been embedded in the image (see FIGS. 5A and 5B and FIGS. 7A and 7B). In the embedding, a value "10" is subtracted from the B component among the R, G, and B components (in the case of using the masks in FIGS. 4A and 4B. A value "10" is added and subtracted in the case of using the masks in FIGS. 6A and 6B). Thus, in a case where, for example, a pattern extending downward to the left is formed in the image with the mask in FIG. 4A, the pattern generates a large power spectrum on a line A02. Likewise, in a case where a pattern extending downward to the right is formed in the image with the mask in FIG. 4B, the pattern generates a large power spectrum on a line A01. Thus, by detecting one of these power spectra, data of "0" or "1" can be extracted. Note that performing edge detection as pre-processing for the power spectrum detection can intensify the power spectra.

In the data extraction by the frequency analysis described above, the analysis region needs to be accurately cut out of the image data. For this reason, a process of correcting misalignment of coordinate positions is performed as well. For example, firstly, a unit region is cut out of the bitmap image and subjected to the frequency analysis. These operations are repeated in the vertical and horizontal directions while shifting the region by one pixel. In a case where the image size is 600 pixels in width and 900 pixels in height, the operations are repeated 64 times in total. Then, the position at which the spectrum becomes most intense is set as a reference position for cutting. Thereafter, using the reference position as a base point, the embedded information is extracted. In this way, the embedded number sequence of "0" and/or "1" can be accurately obtained.

In the present embodiment, as described in S204, the embedded information is text data, and its character codes have been converted into numerical values in "Shift JIS". In this case, with 1-byte codes (half-width characters) in Shift JIS, for example, the alphabetical character "h" corresponds to binary data "01101000", "e" corresponds to "01100101", "l" corresponds to "01101100", and "o" corresponds to "01101111". Thus, in a case where the number sequence of the extracted embedded information is "01101000011001010110110001101100001101111", a character string of the English word "hello" is obtained. The document ID information embedded as embedded information is extracted in this manner.

Figure 8:
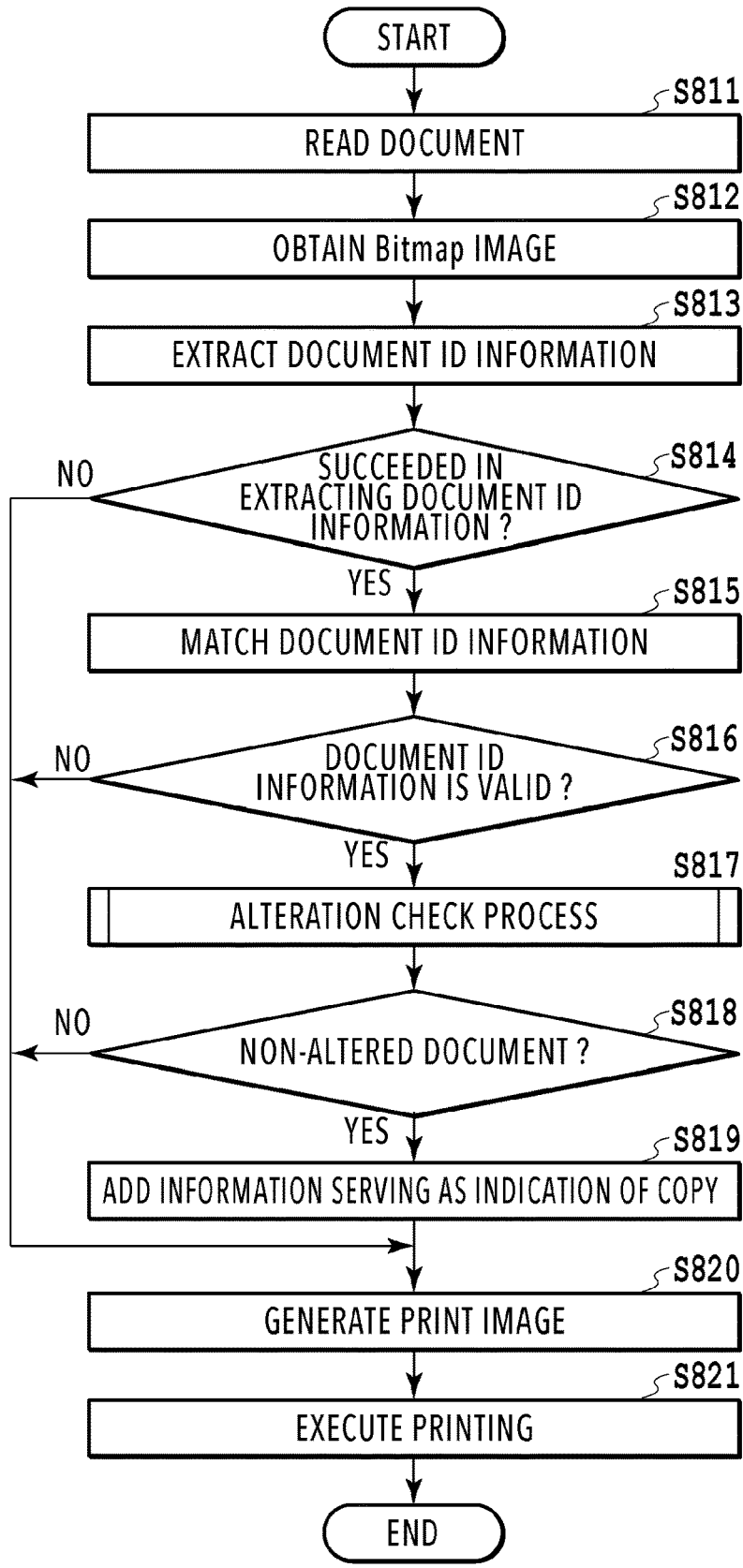
FIG. 8 is a flowchart illustrating a flow of copying a printed product of an original.

The description now returns to the flowchart of FIG. 8.

In next S814, it is determined whether the document ID information has been successfully extracted in S813. The processing proceeds to S815 if the document ID information has been successfully extracted, and proceeds to S820 if the extraction has failed. Here, there are the following two possibilities as cases of failing to extract the document ID information. One is a case (possibility 1) where no document ID information was embedded in the printed product to be copied in the first place. The other one is a case (possibility 2) where document ID information was embedded in the printed product to be copied but the predetermined pattern representing the embedded information cannot be properly detected due to, for example, the printed product being dirty or characters or the like being written by hand afterward. Here, in the case of the possibility 1, the processing may simply proceed to S820. On the other hand, in the case of the possibility 2, the user may be notified of it by, for example, displaying a message indicating that "a genuine document embedded with a document ID (a printed product of an original) is to be copied". In this way, the user can know that a printed product that may not be genuine is to be copied, and thus is given an opportunity to make a choice to, for example, stop the copying operation. For example, in a case where the result obtained by the extraction process is 1 to 31 bits out of the document ID information having a total of 32 bits, it may be determined that there is the possibility 2, and the user may be notified of that effect. It is not entirely impossible for the image to accidentally include only one pattern similar to the above predetermined pattern. Considering such a rare case, it is preferable to determine that there is the possibility 1 if extracting less than 16 bits, which half of 32 bits, and determine that there is the possibility 2 if extracting 16 to 31 bits.

In next S815, a process of matching the successfully extracted document ID information is performed. In the present embodiment, like the document ID obtaining process in S202, the MFP 40 accesses the external PC to request the external PC to perform matching and obtain the result of the matching. Specifically, via a network I/F not illustrated, the MFP 40 sends the external PC a request to perform matching for determining whether the extracted document ID information has been formally registered and is valid, and receives and obtains the result of the matching from the external PC. Incidentally, in a case where the MFP 40 has an enough resource to manage document ID information within the MFP 40, it is also possible to perform a matching process internally.

Then, in S816, the processing branches based on whether the matching result indicates that the document ID information extracted in S813 has been formally registered and is valid. The processing proceeds to S817 in a case of a valid document ID, and proceeds to S820 in a case of an invalid document ID. Here, in the case of an invalid document ID, the user may be notified of that effect by, for example, displaying a message indicating that "a non-genuine document with an invalid document ID is to be copied". In this way, the user is given an opportunity to make a choice to, for example, stop the copying operation.

Figure 10:
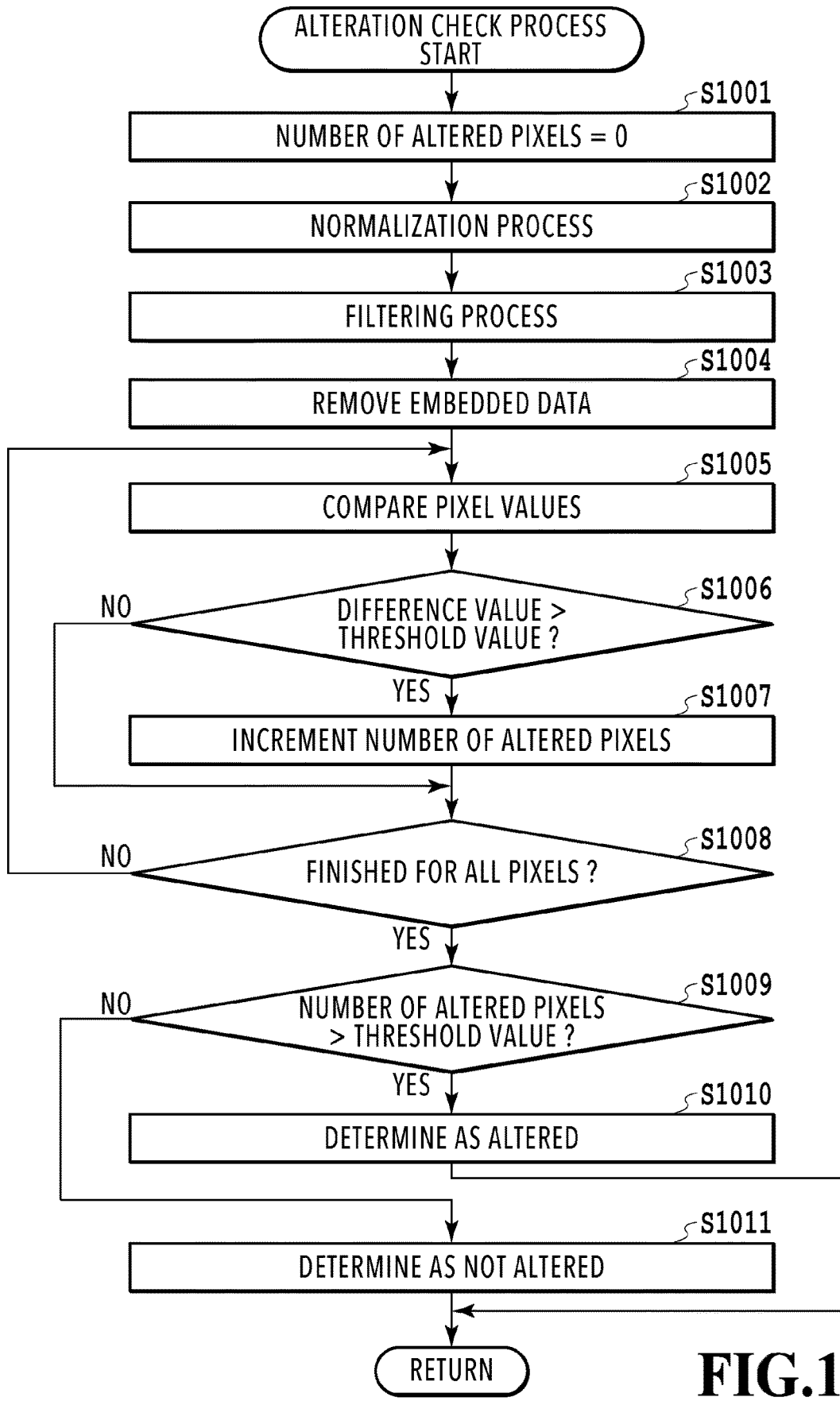
FIG. 10 is a diagram illustrating details of an alteration check process.

In S817, a process of checking whether the printed product to be copied has been altered (alteration check process). A general flow of this alteration check process is as follows. First, via the network I/F 27, the MFP 40 sends a document data obtaining request to the external PC along with the document ID information. Then, the MFP 40 receives and obtains document data (PDL data) associated with the document ID information from the external PC, and performs a rendering process on this document data. These are pre-processing. Then, the MFP 40 compares the bitmap image obtained by the rendering process and the bitmap image obtained in S812 to determine the presence or absence of alteration. The alteration check process will now be described specifically through another flowchart illustrated in FIG. 10. Note that in the description of the flow in FIG. 10, the bitmap image obtained by the rendering process will be referred to as "rendered image", and the bitmap image obtained by the document reading process will be referred to as "scanned image".

<Details of Alteration Check Process>

In S1001, a process of initializing a counter that counts pixels determined to have been altered in S1010 to be described later is performed. Specifically, the count of the counter (the number of altered pixels) is set to "0".

In next S1002, a normalization process is performed on the scanned image obtained in S812. This normalization process is performed to adjust the dynamic ranges of the scanned image and the rendered image to each other. For example, the lightest portion of the scanned image is usually the color of the paper of the read printed product and, in principle, has a value of density. On the other hand, the lightest portion of the rendered image is a pixel with a pixel value of R=255, G=255, and B=255. Also, the darkest portion of the scanned image is the black color of an ink or a toner and, in principle, has a given value of lightness originating from reflected light. On the other hand, the darkest portion of the rendered image is a pixel with a pixel value of R=0, G=0, and B=0. As described above, the two images naturally have different lightest colors and different darkest colors. Also, in a case where the printed product has been output in color mode, the two images have different tonalities. For example, the saturation of the most vivid printable red color in the scanned image is low as compared to the pixel value indicating the most vivid red color in the rendered image (R=255, G=0, B=0). Thus, each pixel value (RGB value) of the scanned image is normalized using Equations (1) to (3) below to derive a new pixel value (Rnorm, Gnorm, Bnorm).

$$Rnorm=(R-Rd)/(Rw-Rd)\times 255 \quad\quad \text{Equation (1)}$$

$$Gnorm=(G-Gd)/(Gw-Gd)\times 255 \quad\quad \text{Equation (2)}$$

$$Bnorm=(B-Bd)/(Bw-Bd)\times 255 \quad\quad \text{Equation (3)}$$

By the normalization process using Equations (1) to (3) above, the RGB value of the lightest color (white) in the scanned image becomes R=255, G=255, and B=255, the RGB value of the darkest color (black) becomes R=0, G=0, and B=0.

In next S1003, a filtering process is performed on the scanned image after the normalization process. This involves performing stronger edge enhancement in order to facilitate the comparison with the rendered image.

In next S1004, a process of removing the image pattern expressing the embedded information from the scanned image after the filtering process is performed. Due to the multiplexing process (S203), there is a difference between the print image generated in S205 in the flow in FIG. 2 described earlier and the actual document image (an image of the electronic document being the original). Thus, the above process is performed to remove this difference as much as possible. Specifically, a process of subtracting the pattern data embedded by the multiplexing process from the scanned image data is performed. This brings the scanned image closer to the state before being subjected to the multiplexing process. In the present embodiment, this process is implemented by adding the values in the masks in FIGS. 4A and 4B or FIGS. 6A and 6B mentioned earlier multiplied by "−1" to the pixels of the scanned image.

Then, in S1005, a process of comparing the scanned image from which the embedded information has been removed and the rendered image is performed. Specifically, a process of deriving difference values ($\Delta R$, $\Delta G$, $\Delta B$) represented by Equations (4) to (6) below is performed by comparing the rendered image and the scanned image after the removal of the embedded information on a pixel-by-pixel basis.

$$\Delta R=|R[x][y] \text{ in Rendered Image}-R[x][y] \text{ in Scanned Image}| \quad\quad \text{Equation (4)}$$

$$\Delta G=|G[x][y] \text{ in Rendered Image}-G[x][y] \text{ in Scanned Image}| \quad\quad \text{Equation (5)}$$

$$\Delta B=|B[x][y] \text{ in Rendered Image}-B[x][y] \text{ in Scanned Image}| \quad\quad \text{Equation (6)}$$

Then, in S1006, it is determined whether any of the difference values ($\Delta R$, $\Delta G$, $\Delta B$) obtained in S1005 is above a threshold value. In the present embodiment, the difference values ($\Delta R$, $\Delta G$, $\Delta B$) are compared with threshold values (Rth, Gth, Bth) provided in advance for the R, G, and B channels, respectively. The processing proceeds to S1007 if any of $\Delta R$, $\Delta G$, and $\Delta B$ is above the corresponding threshold value, and proceeds to S1008 if none of $\Delta R$, $\Delta G$, and $\Delta B$ is above the corresponding threshold value. Note that the threshold values are determined with characteristics of the scanner unit and the printing apparatus and the like taken into consideration. In the present embodiment, values such as Rth=Gth=Bth=64 may be set, for example.

In S1007, the count value of the counter indicating the number of altered pixels is incremented (by one). The processing proceeds to S1008 after the counter is incremented. Then, in S1008, it is determined whether the comparison of the pixel values has been completed for all pixels. If there is a pixel(s) yet to be processed, the processing returns to S1005 and is continued therefrom. If the comparison of the pixel values has been completed for all pixels, the processing proceeds to S1009.

In S1009, it is determined whether the count value of the counter indicating the number of altered pixels is above a threshold value. Considering inclusion of dust at the time of obtaining the scanned image and other similar cases, a value such, for example, as 3% of the number of all pixels may be set as the threshold value in this step. The processing proceeds to S1010 if the count value is above the threshold value, and proceeds to S1011 if the count value is not above the threshold value.

In S1010, the result of the alteration check process is determined as not altered, and the processing is terminated. On the other hand, in S1011, the result of the alteration check process is determined as altered, and the processing is terminated.

The above is the details of the alteration check process. Note that, in the present embodiment, the comparison is done on a pixel-by-pixel basis but is not limited to this manner. It may be done in a larger size by, for example, comparing average values of chunks of pixels. After the alteration check process ends, the processing proceeds to S818 in FIG. 8.

The description now returns to the flowchart of FIG. 8.

In S818, the processing branches based on the result of the alteration check process on the bitmap image obtained in S812. The processing proceeds to S819 if no alteration is present, and proceeds to S820 if alteration is present. Note that if the result of the alteration check process indicates that alteration is present, the user may be notified of that effect by, for example, displaying a message indicating that "an altered document is to be copied". In this way, the user is given an opportunity to make a choice to, for example, stop the copying operation.

Then, in S819, a process of adding information serving as an indication of a copy of a "printed product of the original" to the bitmap image obtained in S812 is performed. By applying an embedding method (e.g., modulation of R, G, and B values) that gives higher visibility than the embedding of the document ID information, what is to be obtained will be easily recognizable as a printed product output as a copy, not as a "printed product of the original". Also, with this addition process, the user may also be notified that a printed product of the original is to be copied by, for example, displaying such a message. In this way, the user is given an opportunity to make a choice to, for example, stop the copying operation.

<Enhancement of Embedded Pattern in Scanned Image>

Figures 11A, 11B:
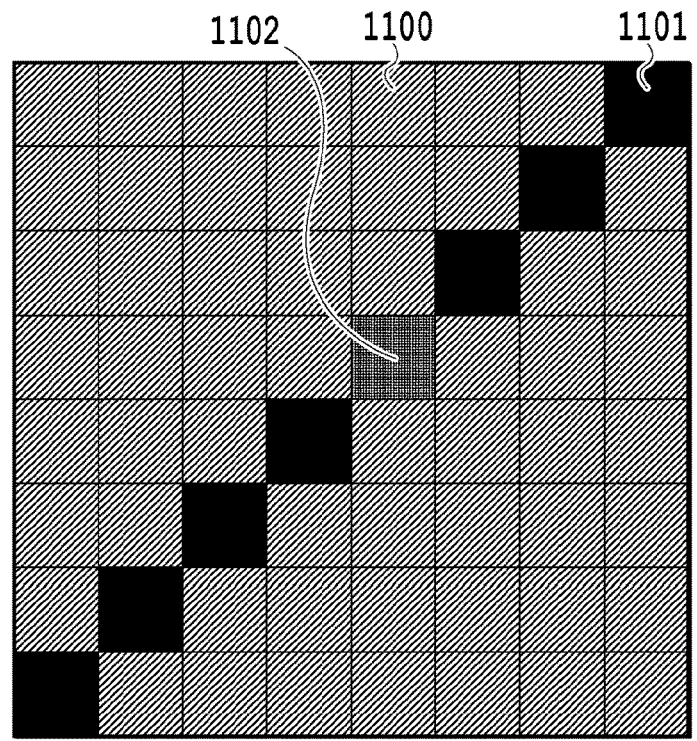
FIGS. 11A and 11B are diagrams explaining a pattern enhancement mask.

The embedded pattern in the bitmap image obtained in S812 is deteriorated due to the printing and scanning. FIG. 11A schematically illustrates the deterioration of a pattern. A mask 1100 is an extracted pattern. A region 1101 is a part of the embedded pattern. A region 1102 is a part of the embedded pattern. As compared to the region 1101, the difference in pixel value from the region other than the embedded pattern is small, and the embedding strength is low.

In the case where the embedded pattern in the scanned image is like the mask 1100, the extracted embedded pattern can be determined to be weak. Also, in a case where an error correction was performed at the time of extracting the document ID information in S813 and a correction was made, the pattern can likewise be determined to be weak. The embedded pattern in the scanned image is enhanced in the case where the embedded pattern is weak. A mask 1103 in FIG. 11B is an enhancement mask created based on the pixel corresponding to the weak portion of the embedded pattern in FIG. 11A.

In a region 1104, a strength to be added to the pixel corresponding to the weak portion of the embedded pattern is set. The strength may be set from the difference between the regions 1101 and 1102, or set uniformly from a predetermined value. With the extracted document ID information, a multiplexing process is performed in a similar manner to S204. At this time, for any region determined as a weak portion of the embedded pattern, an enhancement mask is added to the mask that form the changes in FIG. 4A or 4B, and the multiplexing process is performed. Alternatively, it is also possible to enhance the embedded pattern by generating a pattern based on the created enhancement mask and enhancing the scanned image based on that pattern.

<Reducing Embedded Pattern in Scanned Image and Newly Superimposing Embedded Pattern>

The embedded pattern in the scanned image may be reduced, and a multiplexing process may be performed again. Regarding the method of reducing the embedded pattern, a smoothing filter of a predetermined size is applied to the scanned image. The filter size may be set based on the size of the embedded pattern (here, 8×8). From the embedded pattern, an inverse filter may be calculated and utilized. In a case where the pattern embedding region is a paper white region, a process of changing the pixel values to the value of paper white by under-color removal or the like may be performed. In a case where a particular color plane has been added to the embedded pattern, the above reduction process may be performed only on the particular color.

A multiplexing process is performed to embed the extracted document ID information into the image with the reduced embedded pattern in a similar manner to S204.

In next S820, a print image is generated based on the bitmap image obtained in S812 or the bitmap image subjected to the addition process in S819. Description of this process is omitted since it is equivalent to and not particularly different from S205 in the flow in FIG. 2 described earlier. In next S821, a printing process using the print image generated in S820 is performed.

The above is a process flow for copying of a printed product of an original. Incidentally, instead of performing the notification process, such as displaying a message, in S814, S816, S818, and S819, the processing may be controlled so as to automatically stop the copying process itself at these points. This saves the trouble of confirming the user's intention each time.

Also, the information serving as an indication of a copy, which is added in S819, certifies that the original has not been altered. In other words, it can be seen as "information indicating that the contents are authentic and copied." Thus, character string information more clearly expressing that the printed product to be copied is a genuine document, such as "copied product of a printed product of the original", may be added. Moreover, in the case where it is determined that alteration is present in S818, a character string such as "unauthentic (altered) copied product" may be added and then the processing may proceed to the generation of a print image (S820).

Also, the genuine document ID information extracted from the "printed product of the original" to be copied may be updated to document ID information serving as an indication of a copied product, and then embedded into the bitmap image again and output as a print image in S820. In this way, when the printed product embedded with the updated document ID information output in S820 is to be copied, the user can be notified of that effect. In this case, when the document ID information is obtained in the original printing process (S202), the document ID information serving as an indication of a copied product may additionally be obtained and held in the form of reserved ID information or the like. In this way, it is possible to notify the user that what is to be obtained is a copied product without requesting the external PC to perform matching.

As described above, according to the present embodiment, in a case of copying a "printed product of an original", information indicating this fact is added in the form of visible information that is highly visible. This enables the user to easily recognize that what is to be obtained is a "copied product of the original". Also, in a case where the user further attempts to copy the "copied product of the original" obtained by the above copying process, it is possible to detect the added information serving as an indication of a copy with the copier and notify the user of that fact.

<Modification 1>

In the above embodiment, an example has been described in which document ID information is multiplexed and embedded in 8×8 pixel unit regions. With this method, a predetermined pattern is formed in a high-frequency region in an image. Hence, information can be embedded in such a fashion as to be difficult to visually recognize for the user. However, the information embedding method is not limited to this method. For example, the document ID information may be converted into a two-dimensional code, which may be embedded in such a fashion as to be difficult to visually recognize.

Figure 12B:
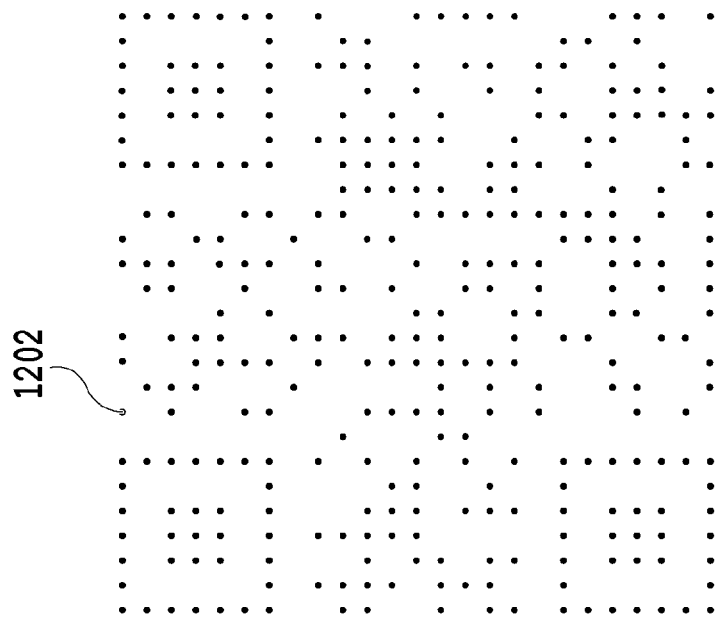
FIGS. 12A and 12B are diagrams explaining a modification of an embedding method.
Figure 12A:
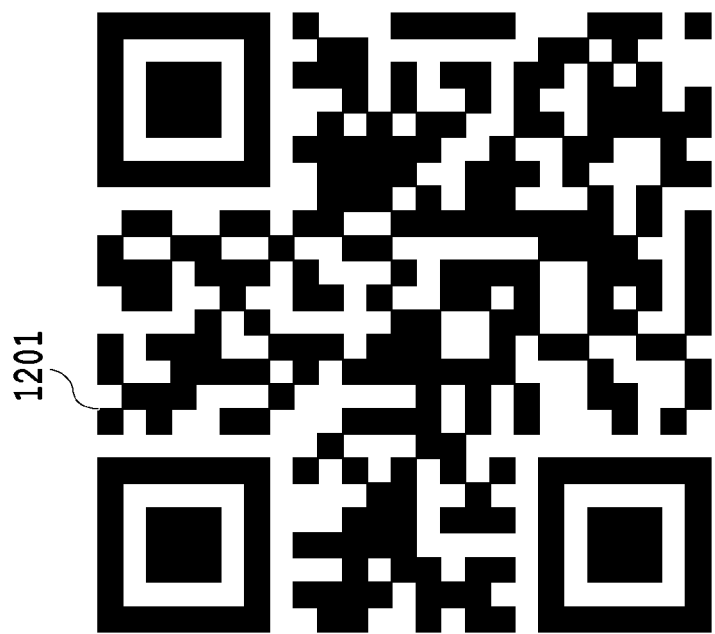

FIG. 12A illustrates an example of the two-dimensional code, and FIG. 12B illustrates an actual print pattern for the two-dimensional code. The example of FIG. 12B is a pattern in which a single dot can be formed in each 8×8 pixel region. The dot at a black pixel 1201 in the two-dimensional code in FIG. 12A corresponds to a single dot 1202 in the print pattern illustrated in FIG. 12B. That is, none of the dots of the print pattern will be formed at any of the positions of the white pixels in the two-dimensional code in FIG. 12A. A specific process flow to implement this may be as follows. Specifically, in the multiplexing process (S204) in the flow in FIG. 2 described earlier, the document ID information is firstly converted into a two-dimensional code, which is then converted into pattern data with separated dots and embedded into the rendered image in units of a predetermined region. Thereafter, in the next print image generation process (S205), the separated dots are formed only with the Y ink. In this way, it will be more difficult to visually recognize the dots.

Also, in a process of copying a printed product in which document ID information was embedded by the method of the present modification, the document ID information may be extracted by extracting the two-dimensional code pattern formed of yellow dots in units of 8×8 pixels from the read bitmap image and decoding the two-dimensional code.

Also, as an embedding method other than the two-dimensional code embedding method, the multiplexing may be done by, for example, modulating the threshold values in the quantization process.

<Modification 2>

So far, the description has been based on the assumption that, in the process of printing an original, document ID information indicating its genuineness is embedded in such a fashion as to as less visible as possible to the user. However, the document ID information may be embedded in such a fashion as to be easily visible to the user (e.g., by modulating the R value and the G value, which may greatly change the density of the C, M, and K inks).

In this case, in a copying process, the rendered image generated in the pre-processing for the alteration check process (S817) may be printed as is, or the bitmap image from which the embedded data has been removed (S1004) may be printed as is. By performing printing by one of these methods, a printed product is output without the document ID information embedded therein. In this case, since no visible pattern data is printed on the paper white region of the printed product obtained by the copying, the user can easily recognize that the printed product is not a "printed product of the original". Also, since there is no embedded data on the copied printed product, if the copied printed product is, in turn, to be copied, the determination in S814 will always result in "No".

<Printing Method According to the Method of Multiplexing>

So far, previously mentioned have explained the flow of printing multiplexed images using the inkjet method, but there is also the flow of printing multiplexed images using electronic photography. Therefore, in the following, we will explain the method of determining embedding conditions and multiplexing image generation according to the printing method. Embedding conditions refer to conditions such as color planes for binary processing, intensity of masks for binary processing, and color densities of printing originals. These conditions can be set using patterns, amplitude patterns, and cycle patterns based on the above-mentioned specific embedded information.

Figure 13:
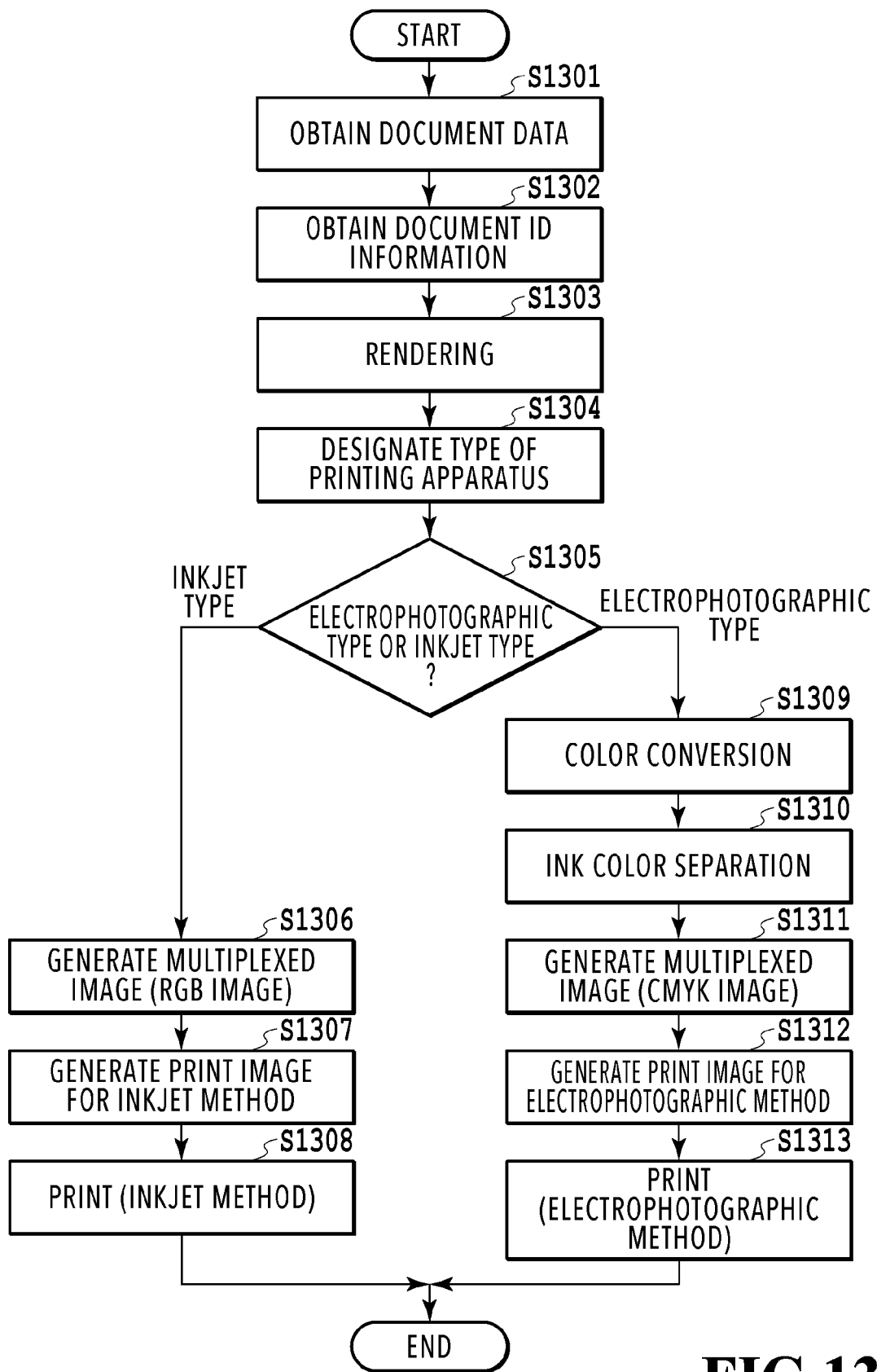
FIG. 13 is a flowchart illustrating a flow of printing a printed document of an original.

FIG. 13 is a flowchart explaining the process of changing the color plane of an image that is multiplexed according to the printing method. Here, we will explain the case of printing with the inkjet system of the MFP 40 or the electronic photo system of the MFP 60. The series of processes illustrated in the flowchart of FIG. 2 starts in response to the user selecting an electronic document to be printed and issuing an instruction to perform printing including embedding information indicating genuineness of the electronic document via a user interface (UI) of a predetermined printing application installed in the PC 20. In S1301, the PC 20 obtains document data. In this embodiment, the host PC 20 will connect to the external PC via Network I/F 27, and request, and obtain document data. In S1302, the PC 20 obtains document ID information indicating genuineness of the document data obtained in S1301. The detailed processing is the same as S202 of FIG. 2.

In S1303, the PC 20 performs rendering process of the document data obtained in S1302. This is the step of executing each drawing command described in PDL, forming a Bitmap image composed of color information for each pixel.

In S1304, the machine to print the multiplexed print data of the document ID information is specified by the user. Specifically, PC 20 will create and display a list of printers that can be printed based on the device information obtained by communicating with the printer on the UI displayed when the user requests printing. The user specifies the device to print from the displayed device list. The PC 20 obtains the type (printing method) of the printing device based on the printing device specified by the user. Here, for the sake of explanation, it is assumed that only inkjet or electronic photo printing devices are connected as a type of acceptable printing device. In addition, you may display a screen that allows the user to select the printing device while confirming the printing method of the printing device in the list of printing devices on the UI. The above is valid if the user does not understand the printing method of the printing device.

In S1305, PC 20 will switch the subsequent processing depending on whether the printing method obtained in S1304 is electrophotographic method or inkjet method. If it is an inkjet method, the processing proceeds to S1306, if it is an electronic photo method, the processing proceeds to S1309.

In the processing of S1306 to 1308, the flow of printing multiplexed images with inkjet method will be explained. In S1306, the PC 20 embeds the document ID information obtained in S1302 into the Bitmap image rendered in S1303 to generate a multiplexed image. The rendered Bitmap image is expressed in the RGB space, and the embedding process is performed on the B plane, which has low visibility among the RGB. The detailed embedding process is the same as the process described in S204 of FIG. 2.

In S1307, PC 20 generates an inkjet print image from the multiplexed image generated in S1306. Regarding the detailed generation method, it is the same as the process described in S205 of FIG. 2. That is, in the processing of this step, color separation process, which is processing for converting RGB image data into CMYK image data, is also performed. In S1308, the PC 20 transmits the inkjet print image generated in S1307 to the inkjet MFP 40 via the DATA TRANSFER I/F 24 in the host PC 20, and performs printing control. At this time, the DATA TRANSFER I/F 24 switches the print image destination based on the printing device specified in S1304. When printing is complete, PC 20 will end this flow.

In the processing of S1309 to S1313, the flow of printing a multiplexed image by electrophotographic method will be described. In S1309, the PC 20 performs color conversion on the Bitmap image generated in S1303. Color conversion is a process of converting the RGB information of a Bitmap image so that it can be suitably printed by the MFP 60, which is a printing device, in an electrophotographic method. Printing by electrophotographic method is easier to see than the inkjet method because ink is not on the paper. Therefore, if the color material used in the MFP 60 is embedded with a highly visible ink color other than yellow, it will stand out. Therefore, the RGB image data is embedded in the Y plane after color separation into CMYK image data. The detailed conversion method is the same as the color conversion described in S205 of FIG. 2 and perform color conversion using table 1 that matches the MFP 60.

In S1310, PC 20 will perform ink color separation on the image after color conversion generated in S1309, which is used in MFP 60. In this embodiment, the MFP 60 is a four-color electrophotograph of cyan, magenta, yellow, and black. The detailed processing contents of the ink color separation are the same as the ink color separation described in S205 of FIG. 2.

In S1311, the PC 20 embeds the document ID information obtained in S1302 into the ink color separation image generated in S1310 to generate a multiplexed image. As described above, here, the embedding process is performed on the Y plane separated into ink colors. Since the obtained document ID information is held in binary, the embedded mask is switched based on the bit information. The pattern uses two masks shown in FIGS. 4A and 4B. The document ID information is superimposed on the image by switching the mask based on the bit information of the document ID information and changing the target pixel value of the Y plane according to the modulation in the mask. Here, the method of performing multiplexing processing on the Y plane has been described, but when the image area for which the multiplexing process is performed uses ink other than yellow ink, it may be performed on a plane other than the Y plane.

In S1312, the PC 20 generates an electrophotographic print image from the multiplexed image generated in S1311. That is, the same processing as the output characteristic conversion process and quantization process described in S205 of FIG. 2 is performed. In this step, color conversion process and color separation process are performed in S1309 and S1310, so these processes are unnecessary. Table 3 used for output characteristic conversion and Halftone table used for quantization are processed using tables adapted to the MFP 60.

In S1313, the PC 20 transmits the electrophotographic print image generated in S1312 to the electrophotographic MFP 60 via the DATA TRANSFER I/F 24 in the host PC 20, and performs printing control. At this time, the DATA TRANSFER I/F 24 switches the print image destination based on the printing device specified in S1304. When printing is completed, the PC 20 terminates this flow.

The above is a description of the flow of processing for changing the color plane of an image to be multiplexed according to the printing method of the printing apparatus. According to this embodiment, it is possible to improve the balance between the extraction accuracy of embedded information and the image quality in printing methods other than the inkjet method. Specifically, when an electrophotographic printing apparatus is specified as the printing method, embedding information in the Y plane of a CMYK image enables inconspicuous embedding in each printing method, and image quality deterioration due to multiplexing can be reduced.

This embodiment is also effective when multiplexing is performed by an inkjet method. Inkjet method use a wide variety of ink types, such as dark ink, light ink, and special colors, depending on the printing device. Either dark ink or light ink or both may be used depending on the gradation to be expressed. Therefore, when multiplexing is performed only on a specific plane, such as performing multiplexing process on a dark ink plane, dots may not be ejected depending on the gradation. As a result, a multiplexed pattern cannot be formed, and the extraction accuracy may deteriorate. In this embodiment, when printing by the inkjet method, the plane to be multiplexed is determined to be the B plane of the RGB image data instead of the CMYK image data, thereby solving the above-described problem of dealing with multiple ink colors that occurs in the inkjet method.

Embodiment 2

Next, a method for changing the embedding superimposing intensity according to the printing method will be described. The ink-jet method and the electrophotographic method differ in the color development characteristics of the printed document. Electrophotography has better color development and higher visibility than inkjet. Therefore, when multiplexing is performed by the electrophotographic method, if processing is performed with an embedding strength equivalent to that of the inkjet method, the pattern of multiplexing becomes conspicuous in the printed document. In order to avoid this, if the embedding strength is uniformly weakened, the pattern formation may be insufficient in the inkjet method, resulting in a decrease in reading accuracy. A method of maintaining a balance between robust reading performance and image quality in each printing method by changing the embedding superimposing strength according to the printing method will be described below. In the description below, a method of maintaining a balance between the robustness of reading performance and the image quality in each printing method by changing the embedding multiplexing intensity according to the printing method will be described.

Figure 14:
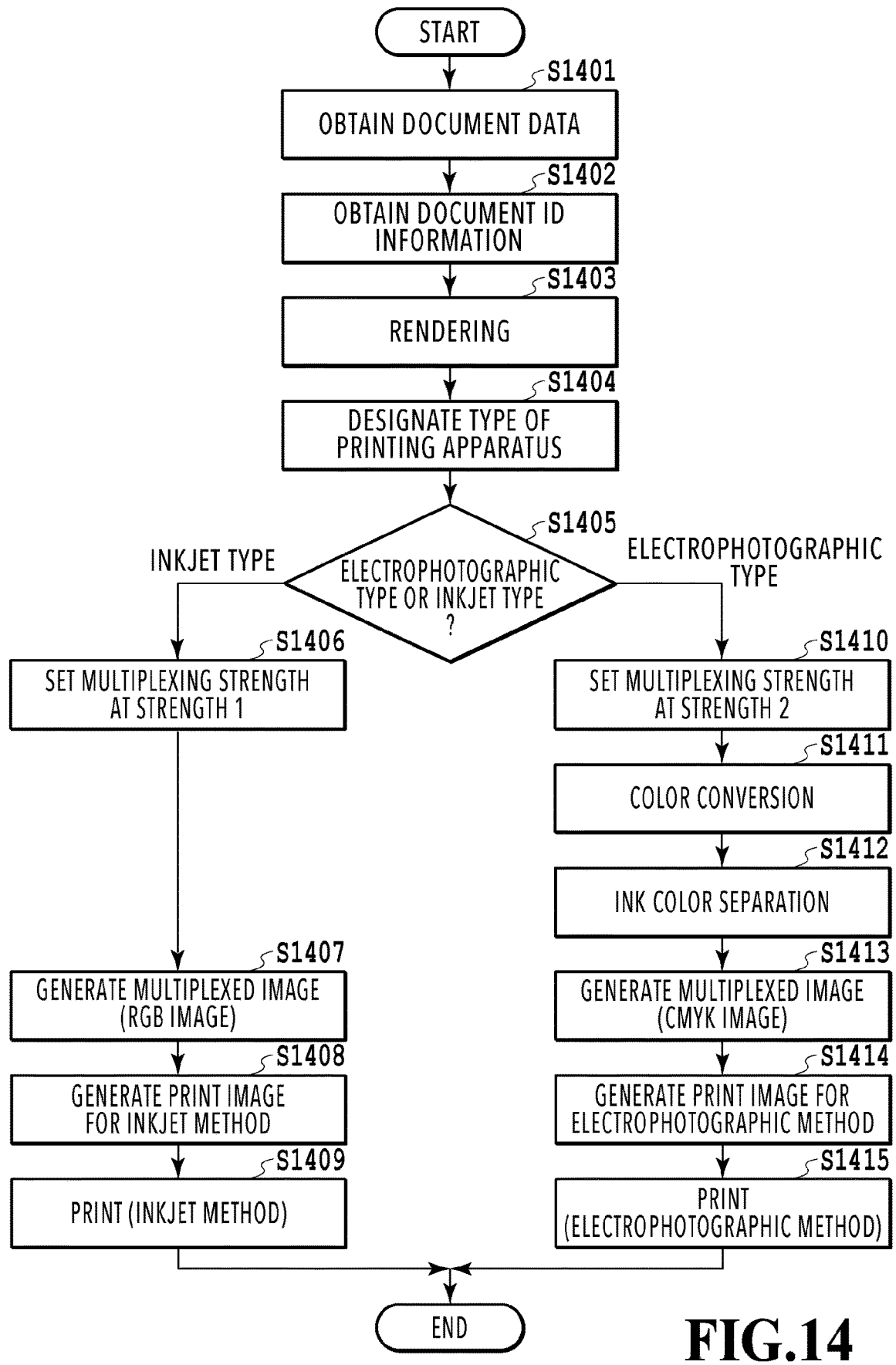
FIG. 14 is a flowchart illustrating a flow of printing a printed document of an original.

FIG. 14 is a flowchart for explaining processing for changing the embedding superimposing intensity according to the printing method. Here, a case of printing with the MFP 40 of the inkjet system or the MFP 60 of the electrophotographic system will be described.

Since S1401 to S1404 are the same processing as S1301 to S1304 in FIG. 13, description thereof is omitted here. In S1405, the PC 20 switches processing depending on whether the printing method is an electrophotographic method or an inkjet method. In the case of the inkjet method, the process proceeds to S1406, and in the case of the electrophotographic method, the process proceeds to S1410.

In the processes of S1406 to S1409, the flow for printing a multiplexed image by the inkjet method will be described. In S1406, the PC 20 sets the embedding strength of the pattern multiplexed by the inkjet method. Here, for the sake of explanation, the amount of variation when generating an embedding pattern is changed as the embedding strength.

FIG. 15 shows intensity-specific embedded masks used for multiplexing. Since the mask is switched based on the binarized document ID information, there are masks representing "0" and "1" respectively. FIGS. 15A and 15B have a larger amount of variation than FIGS. 15C and 15D. That is, the masks of FIGS. 15A and 15B show that the embedding strength is higher than that of the masks of FIGS. 15C and 15D. Assume that the strength of the mask shown in FIGS. 15A and 15B are strength 1, and that the strength of the mask shown in FIGS. 15C and 15D are strength 2. In this embodiment, the inkjet method uses strength 1, which is a strong embedding strength, and the electrophotographic method uses strength 2, which is a weak embedding strength. This is because the electrophotographic method has higher visibility than the inkjet method.

In S1406, the PC 20 uses a mask with a strength 1 during the multiplexing process in order to obtain the multiplexing strength in the inkjet method. In S1407, the PC 20 embeds the obtained document ID information into the bitmap image generated in S1403 based on the superimposing strength set in S1406, thereby generating a multiplexed image. Embedding process is performed on the B plane of the bitmap image with the set superimposing strength. The detailed embedding process is the same as the process described in S204 of FIG. 2, and the set mask (strength 1) is used for embedding. Since S1408 and S1409 are the same as the processing of S1307 and S1308 in FIG. 13, description thereof is omitted. After printing is completed, the PC 20 terminates this flow.

In the processing of S1410 to S1415, the flow of printing a multiplexed image by electrophotographic method will be described. In S1410, the PC 20 sets the embedding strength of the pattern multiplexed by the electrophotographic method. Here, a mask with strength 2, which has a smaller variation than strength 1, is used during multiplexing.

In S1411, the PC 20 performs color conversion on the bitmap image generated in S1403. The detailed color conversion method is the same as the color conversion described in S1309 of FIG. 13. In S1412, the color converted image generated in S1411 is subjected to ink color separation for the number of ink colors used in the MFP 60. Here, it is separated into four colors of cyan, magenta, yellow, and black. The detailed processing contents of the ink color separation are the same as the ink color separation described in S1310 of FIG. 13.

In S1413, based on the superimposing strength set in S1410, the obtained document ID information is embedded in the ink color separation image generated in S1412 to generate a multiplexed image. Using the set superimposing strength, the embedding process is performed on the Y plane of the ink color separated image. The set strength 2 is used for the mask used for embedding.

Since S1414 and S1415 are the same as the processing of S1312 and S1313 in FIG. 13, description thereof is omitted. After printing is completed, the PC 20 terminates this flow.

The above is the description of the flow for describing the process of changing the superimposing strength to be embedded according to the printing method. According to this embodiment, it is possible to perform multiplexing with a multiplexing strength corresponding to the printing method selected by the user. In addition, it is possible to maintain a balance between extraction accuracy of embedded information and image quality in the printing method.

In this embodiment, for the sake of explanation, the amount of change in the mask was used as an example to change the superimposing strength, but the strength may be changed by switching the number of color planes to be embedded between the inkjet method and the electrophotographic method. For example, in electrophotography, multiplexing is performed only on the Y plane, and in the inkjet method, multiplexing is performed not only on the B plane but also on the R plane, so that the intensity can be changed. Also, the embedding strength may be changed by increasing the relative amount of variation by increasing the amplitude in combination with decreasing the amplitude of the mask. In that case, the electrophotographic method is set so that the amount of relative variation is smaller than that of the inkjet method. Also, the embedding strength may be changed by changing the number of varying portions of the mask. In this case, the electrophotographic method is set so that there are fewer fluctuation points than the inkjet method.

Embodiment 3

In this embodiment, a method of changing the density of an image to be embedded according to the printing method will be described. When a document printed by an electrophotographic method is read by a scanner or a camera, the light source is strongly reflected in the dark portion where the image density is higher than a predetermined value, and the image quality of the read image may be degraded. As a result, the accuracy of extracting authentic document information from the read image decreases. Also, when printing a multiplexed document by an inkjet method, there is a risk that the multiplexed pattern will be destroyed by bleeding of the ink in the dark portion, resulting in a decrease in reading accuracy. In this embodiment, a method for reducing image quality deterioration and improving the extraction accuracy of embedded information by adjusting the density of dark portions according to each printing method will be described.

Figure 16:
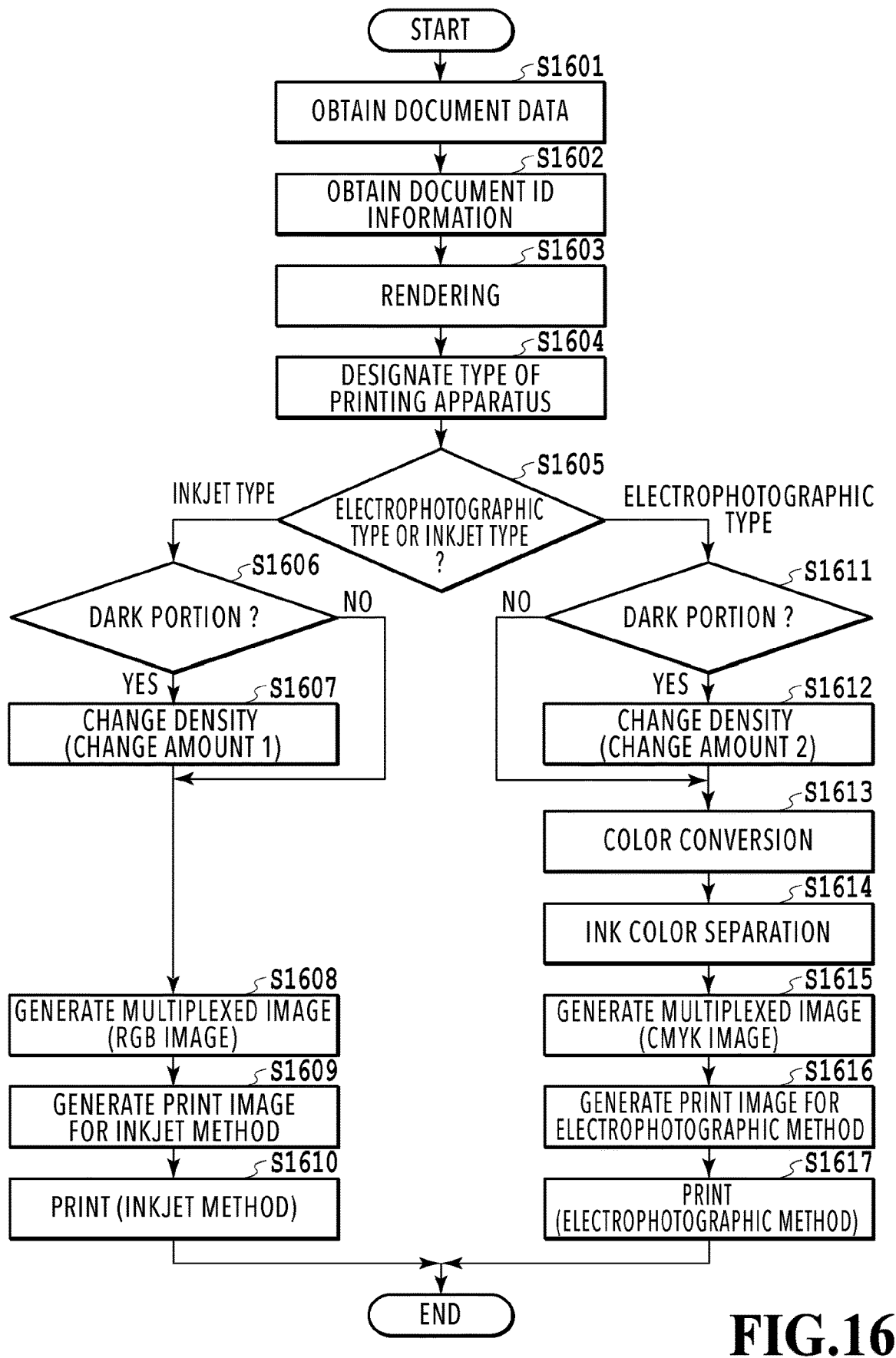
FIG. 16 is a flowchart illustrating a flow of printing a printed document of an original.

FIG. 16 is a flowchart for explaining processing for changing the image density to be embedded according to the printing method. In the present embodiment as well, the case of printing with the inkjet method MFP 40 or the electrophotographic method MFP 60 will be described.

Since S1601 to S1604 are the same processing as S1301 to S1304 in FIG. 13, description thereof is omitted here. In S1605, the PC 20 switches processing according to whether the printing method is an electrophotographic method or an inkjet method. In the case of the inkjet method, the process proceeds to S1606, and in the case of the electrophotographic method, the process proceeds to S1611.

In the processes of S1606 to S1610, the flow for printing a multiplexed image by the inkjet method will be described. In S1606, the PC 20 determines whether the image area to be superimposed is a dark portion. A method of determining whether or not an area is a dark portion may be to calculate the average luminance from the RGB values of m×N pixels, and determine that the M×N pixels are a dark portion when the average luminance is smaller than a threshold value. Here, for the sake of explanation, M and N are set to the same values as the vertical and horizontal sizes of the image. The threshold may be, for example, 64/255, which corresponds to ¼ of the luminance range. If it is determined that the dark portion is included, the process proceeds to S1607, and if it is determined that the dark portion is not included, the process proceeds to S1608.

In S1607, the PC 20 changes the density of the image area to be superimposed. The bitmap of the RGB space obtained in S1603 is obtained, and the RGB space is changed to the Lab space. A change table is used to change pixel values in the changed Lab space.

Figure 17:
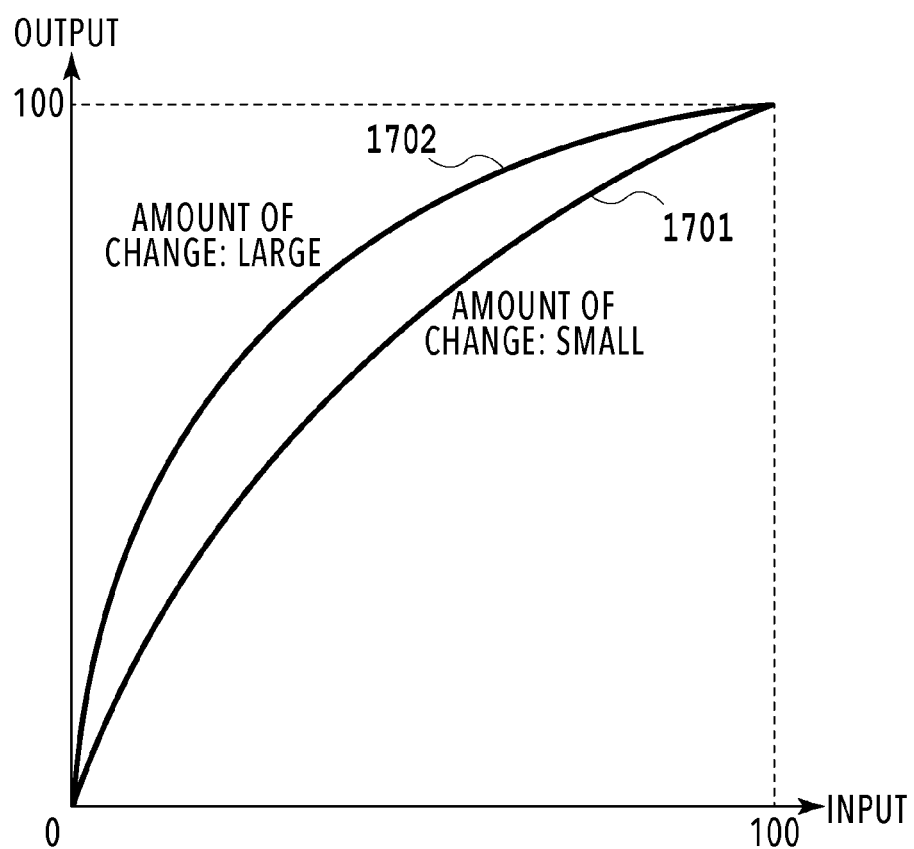
FIG. 17 is a diagram illustrating tables for changing density.

FIG. 17 is a diagram relating to a table for each intensity, which is referred to when changing the image density. The horizontal axis indicates the input L value, and the vertical axis indicates the output L value. The change table 1701 has a small amount of change in the dark portion, and the change table 1702 has a large amount of change in the dark portion. The changed table 1702 makes the dark part after conversion brighter than the changed table 1701. By changing the L value using each table based on the input L value, the density of the dark portion can be adjusted. In this embodiment, the inkjet method uses a change table 1701 with a small change amount, and the electrophotographic method uses a change table 1702 with a large change amount. The table is set in advance from the measured values so that the density values of the dark portions of the inkjet method and the electrophotographic method are predetermined values.

In S1607, the PC 20 performs density conversion of the dark portion in the Lab space using the change table 1701, and returns the converted Lab to RGB, thereby performing multiplexing processing in the RGB space.

In S1608, the obtained document ID information is embedded in the bitmap image generated in S1603 or the density-adjusted image generated in S1607 to generate a multiplexed image. Multiplexing processing is performed on the B plane of the image. The detailed embedding process is the same as the process described in S204 of FIG. 2. Since S1609 to S1610 are the same processing as S1307 to S1308 in FIG. 13, description thereof is omitted. After printing is completed, the PC 20 terminates this flow.

In the processing of S1611 to S1617, the flow for printing a multiplexed image by electrophotography will be described. In S1611, the PC 20 determines whether or not the image area to be superimposed is a dark portion, as in S1606. Here, for the sake of explanation, the dark portion determination method is the same method as in S1406, but if necessary, the dark portion determination threshold may be set to be stricter in the electrophotographic method than in the inkjet method. If it is determined that the dark portion is included, the process proceeds to S1612, and if it is determined that the dark portion is not included, the process proceeds to S1613.

In S1612 the PC 20 changes the density of the image area to be multiplexed. The bitmap of the RGB space obtained in S1603 is obtained, and the RGB space is changed to the Lab space. The changed pixel values in the Lab space are changed using the change table 1702 having a large change amount. Then, Lab after conversion is returned to RGB.

In S1613, the PC 20 performs color conversion on the bitmap image generated in S1603 or the density converted image generated in S1612. The detailed color conversion method is the same as the color conversion described in S1309 of FIG. 13.

In S1614, the PC 20 performs ink color separation for the number of ink colors used in the MFP 60 for the color converted image generated in S1613. Here, it is separated into four colors of cyan, magenta, yellow, and black. The detailed processing contents of the ink color separation are the same as the ink color separation described in S1310 of FIG. 13.

In S1615, the PC 20 embeds the obtained document ID information in the ink color separation image generated in S1614 to generate a multiplexed image. The multiplexing process is performed on the Y plane of the ink color separated image.

Since S1616 and S1617 are the same processing as S1312 and S1313 in FIG. 13, description thereof will be omitted. After printing is completed, the PC 20 terminates this flow.

The above is the description of the flow of processing for changing the density of the image to be embedded according to the printing method. According to this embodiment, by adjusting the density of the dark region to be low at the time of embedding, light source reflection at the time of reading can be suppressed, and image quality deterioration can be reduced. Also, by adjusting the density of the dark area to be thin, bleeding is reduced, the pattern is maintained, and the extraction accuracy is maintained. Further, by adjusting the density of the dark portion according to the printing method, it is possible to maintain a balance between the robustness of the reading performance and the image quality in each printing method.

Other Embodiments

Each of the aforementioned embodiments may be combined as appropriate. For example, when printing is to be performed by the electrophotographic MFP 60, after changing the density of the dark portion of the print document in S1612, mask processing with a strength suitable for the electrophotographic method may be performed as shown in S1410. This makes it possible to make the pattern of multiplexing less conspicuous while suppressing light source reflection during reading.

In the above described embodiment, a rendered image rendered based on PDL is used as image data in which embed information used for printing is embedded, but the present invention is not limited to this. For example, the PC 20 may embed the embedded information in the RGB image data externally obtained via USB, IEEE1394, LAN, or the like. Also, as described above, the embedded information is not limited to a form that guarantees the original, and may be embedded in the paper in a form that makes it difficult for the user to visually recognize the predetermined information.

Also, as described above, the embedded information is not limited to a form that guarantees the original, and may be embedded in the paper in a form that makes it difficult for the user to visually recognize the predetermined information.

Also, as multiplexing target planes for multiplexing recording with Y ink, the B plane in the inkjet method and the Y plane in the electrophotographic method have been described. However, in actual products, due to the influence of color correction and other image processing, there are cases where some inks such as C and M other than Y ink are printed. The present invention can be applied even in such a case where some other color ink is generated.

Further, although RGB image data and PDL data have been described as examples of input documents, the present invention can also be applied to other input document formats.

Further, although the PC 20 mainly executes the processing of the above-described embodiment, the present invention is not limited to this, and the printing apparatus may execute all processing from multiplexing processing to printing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-178185, filed Oct. 29, 2021, which is hereby incorporated by reference wherein in its entirety.

What is claimed is:

1. An image processing apparatus for generating a printed document with specific information embedded therein, comprising:
   a first obtaining unit configured to obtain image data to be used in printing;
   a second obtaining unit configured to obtain the specific information;
   an acceptance unit configured to accept designation of a printing apparatus for executing printing;
   an embedding condition determination unit configured to determine a condition for embedding the specific information into the image data according to a type of the accepted printing apparatus;
   a multiplexed image generation unit configured to generate a multiplexed image by executing embedding of the specific information under the condition determined by the embedding condition determination unit; and
   a control unit configured to perform control such that the printing apparatus prints the multiplexed image.

2. The image processing apparatus according to claim 1, wherein the type of the printing apparatus includes an inkjet method or an electrophotographic method.

3. The image processing apparatus according to claim 1, wherein the embedding condition determination unit executes the embedding on a plane corresponding to the type of the printing apparatus.

4. The image processing apparatus according to claim 3, wherein in a case where the type of the printing apparatus is an inkjet method, the embedding condition determination unit sets, as the plane where to execute the embedding, a plane of a color space before being converted into a color plane of a color material to be used in the printing by the printing apparatus.

5. The image processing apparatus according to claim 3, wherein in a case where the type of the printing apparatus is an inkjet method, the embedding condition determination unit executes the embedding such that embedding strength is higher on a B plane of an RGB color space than on remaining planes thereof.

6. The image processing apparatus according to claim 5, wherein in a case where the type of the printing apparatus is the inkjet method, the embedding condition determination unit sets the B plane of the RGB color space as the plane where to execute the embedding.

7. The image processing apparatus according to claim 3, wherein in a case where the type of the printing apparatus is an electrophotographic method, the embedding condition determination unit sets, as the plane where to execute the embedding, a color plane of a color material to be used in the printing by the printing apparatus.

8. The image processing apparatus according to claim 7, wherein in a case where the type of the printing apparatus is the electrophotographic method, the embedding condition determination unit executes the embedding such that embedding strength is higher on a Y plane among C, M, Y, and K planes representing a plurality of the color planes than on the remaining planes.

9. The image processing apparatus according to claim 8, wherein in a case where the type of the printing apparatus is an electrophotographic method, the embedding condition determination unit sets the Y plane among the C, M, Y, and K planes as the color plane where to execute the embedding.

10. The image processing apparatus according to claim 1, wherein the embedding condition determination unit embeds the specific information with embedding strength corresponding to the type of the printing apparatus.

11. The image processing apparatus according to claim 10, wherein the embedding condition determination unit sets higher strength of the embedding of the specific information into the image data in a case where the type of the printing apparatus is an inkjet method than in a case where the type of the printing apparatus is an electrophotographic method.

12. The image processing apparatus according to claim 1, wherein the embedding condition determination unit performs a density conversion corresponding to the type of the printing apparatus on a portion of the printed document whose density is above a predetermined density.

13. The image processing apparatus according to claim 12, wherein the embedding condition determination unit performs the density conversion on the image data such that the density is higher in a case of executing the printing with the type of the printing apparatus being an inkjet method than in a case of executing the printing with the type of the printing apparatus being an electrophotographic method.

14. The image processing apparatus according to claim 1, wherein the image data is RGB image data or image data rendered based on a page description language (PDL).

15. The image processing apparatus according to claim 1, wherein the specific information is information indicating that the printed document is genuine.

16. A method of controlling an image processing apparatus for generating a printed document with specific information embedded therein, the method comprising:
   obtaining image data to be used in printing;
   obtaining the specific information;
   accepting designation of a printing apparatus for executing the printing;
   determining a condition for embedding the specific information into the image data according to a type of the accepted printing apparatus;
   generating a multiplexed image by executing embedding under the condition determined by the determining; and
   performing control such that the printing apparatus prints the multiplexed image.

17. The method of controlling an image processing apparatus according to claim 16, wherein the type of the printing apparatus includes an inkjet method or an electrophotographic method.

18. The method of controlling an image processing apparatus according to claim 16, wherein the determining includes executing the embedding on a plane corresponding to the type of the printing apparatus.

19. The method of controlling an image processing apparatus according to claim 18, wherein the determining includes, in a case where the type of the printing apparatus is an inkjet method, setting, as the plane where to execute the embedding, a plane of a color space before being converted into a color plane of a color material to be used in the printing by the printing apparatus.

20. The method of controlling an image processing apparatus according to claim 18, wherein the determining includes, in a case where the type of the printing apparatus is an inkjet method, executing the embedding such that embedding strength is higher on a B plane of an RGB color space than on remaining planes thereof.

* * * * *